(12) United States Patent
Dennis

(10) Patent No.: US 9,776,910 B2
(45) Date of Patent: *Oct. 3, 2017

(54) VANADIUM-BASED FRIT MATERIALS, AND/OR METHODS OF MAKING THE SAME

(71) Applicant: Guardian Industries Corp., Auburn Hills, MI (US)

(72) Inventor: Timothy A. Dennis, Bloomdale, OH (US)

(73) Assignee: Guardian Glass, LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/332,448

(22) Filed: Jul. 16, 2014

(65) Prior Publication Data

US 2014/0326393 A1    Nov. 6, 2014

Related U.S. Application Data

(62) Division of application No. 12/929,875, filed on Feb. 22, 2011, now Pat. No. 8,802,203.

(51) Int. Cl.
*C03C 8/04* (2006.01)
*C03C 8/24* (2006.01)
(Continued)

(52) U.S. Cl.
CPC ............ *C03C 8/06* (2013.01); *C03C 8/04* (2013.01); *C03C 8/24* (2013.01); *C03C 27/06* (2013.01);
(Continued)

(58) Field of Classification Search
CPC .... C03C 8/04; C03C 8/06; C03C 8/24; C03C 2205/00; C03C 2203/10
See application file for complete search history.

(56) References Cited

U.S. PATENT DOCUMENTS 2,727,301 A    12/1955    Magnus et al.
2,936,923 A    5/1960    Veres
(Continued)

FOREIGN PATENT DOCUMENTS

AU    60 657    1/1967
CN    1738776 A    2/2006
(Continued)

OTHER PUBLICATIONS

U.S. Appl. No. 12/929,875, filed Feb. 22, 2011; Dennis.
(Continued)

*Primary Examiner* — Karl Group
(74) *Attorney, Agent, or Firm* — Nixon & Vanderhye P.C.

(57) ABSTRACT

Certain example embodiments relate to improved seals for glass articles. Certain example embodiments relate to a composition used for sealing an insulted glass unit. In certain example embodiments the composition includes vanadium oxide, barium oxide, zinc oxide, and at least one additional additive. For instance, another additive that is a different metal oxide or different metal chloride may be provided. In certain example embodiments, a vacuum insulated glass unit includes first and second glass substrates that are sealed together with a seal that includes the above-described composition.

5 Claims, 19 Drawing Sheets

(51) Int. Cl.
*C03C 8/06* (2006.01)
*C03C 27/06* (2006.01)
*E06B 3/66* (2006.01)
*E06B 3/673* (2006.01)

(52) U.S. Cl.
CPC ............ *E06B 3/6612* (2013.01); *E06B 3/673* (2013.01); *C03C 2205/00* (2013.01)

(56) References Cited

U.S. PATENT DOCUMENTS

| | | | |
|---|---|---|---|
| 2,988,852 A | 6/1961 | Henry | |
| 3,120,433 A | 2/1964 | Van Zee | |
| 3,222,153 A | 12/1965 | Brown | |
| 3,252,811 A | 5/1966 | Beall | |
| 3,267,569 A | 8/1966 | Eichorn et al. | |
| 3,331,659 A | 7/1967 | Malloy | |
| 3,650,778 A | 3/1972 | Dumesnil et al. | |
| 3,837,866 A | 9/1974 | Malmendier et al. | |
| 3,862,830 A | 1/1975 | Stern | |
| 3,947,260 A | 3/1976 | Salisbury | |
| 3,981,753 A | 9/1976 | Hopper | |
| 3,995,941 A | 12/1976 | Nagahara et al. | |
| 4,045,200 A | 8/1977 | Salisbury | |
| 4,130,408 A | 12/1978 | Crossland et al. | |
| 4,186,023 A | 1/1980 | Dumesnil et al. | |
| 4,221,604 A | 9/1980 | Chirino et al. | |
| 4,252,415 A | 2/1981 | Klein et al. | |
| 4,256,495 A | 3/1981 | Kawamura et al. | |
| 4,269,617 A | 5/1981 | Shibuya et al. | |
| 4,314,031 A | 2/1982 | Sanford et al. | |
| 4,450,441 A | 5/1984 | Person et al. | |
| 4,482,579 A | 11/1984 | Fujii et al. | |
| 4,683,154 A | 7/1987 | Benson et al. | |
| 4,743,302 A | 5/1988 | Dumesnil et al. | |
| 4,788,471 A | 11/1988 | Strauss | |
| 4,801,488 A | 1/1989 | Smith | |
| 4,810,484 A | 3/1989 | Uedaira et al. | |
| 4,820,365 A | 4/1989 | Brumm et al. | |
| 5,013,360 A | 5/1991 | Finkelstein et al. | |
| 5,051,381 A | 9/1991 | Ohji et al. | |
| 5,089,446 A | 2/1992 | Cornelius et al. | |
| 5,188,990 A | 2/1993 | Dumesnil et al. | |
| 5,336,644 A | 8/1994 | Akhtar et al. | |
| 5,355,051 A | 10/1994 | Fondrk | |
| 5,516,733 A | 5/1996 | Morena | |
| 5,534,469 A | 7/1996 | Hayashi | |
| 5,589,731 A | 12/1996 | Fahlen et al. | |
| 5,599,753 A | 2/1997 | Watzke et al. | |
| 5,643,644 A | 7/1997 | Demars | |
| 5,643,840 A | 7/1997 | Hikata et al. | |
| 5,657,607 A | 8/1997 | Collins et al. | |
| 5,664,395 A | 9/1997 | Collins et al. | |
| 5,766,053 A | 6/1998 | Cathey et al. | |
| 5,891,536 A | 4/1999 | Collins et al. | |
| 5,902,652 A | 5/1999 | Collins et al. | |
| 6,187,700 B1 | 2/2001 | Merkel | |
| 6,300,263 B1 | 10/2001 | Merkel | |
| 6,326,685 B1 | 12/2001 | Jin et al. | |
| 6,336,984 B1 | 1/2002 | Aggas | |
| 6,365,242 B1 | 4/2002 | Veerasamy | |
| 6,383,580 B1 | 5/2002 | Aggas | |
| 6,391,809 B1 | 5/2002 | Young | |
| 6,399,169 B1 | 6/2002 | Wang et al. | |
| 6,444,281 B1 | 9/2002 | Wang et al. | |
| 6,472,032 B1 | 10/2002 | Asano | |
| 6,503,583 B2 | 1/2003 | Nalepka et al. | |
| 6,506,472 B1 | 1/2003 | Tanaka et al. | |
| 6,541,083 B1 | 4/2003 | Landa et al. | |
| 6,566,290 B2 | 5/2003 | Beall et al. | |
| 6,635,321 B2 | 10/2003 | Wang et al. | |
| 6,641,689 B1 | 11/2003 | Aggas | |
| 6,692,600 B2 | 2/2004 | Veerasamy et al. | |
| 6,701,749 B2 | 3/2004 | Wang et al. | |
| 6,946,171 B1 | 9/2005 | Aggas | |
| 6,998,776 B2 | 2/2006 | Aitken et al. | |
| 7,105,235 B2 | 9/2006 | Lo et al. | |
| 7,244,480 B2 | 7/2007 | Minaai et al. | |
| 7,425,518 B2 | 9/2008 | Yoshida et al. | |
| 7,435,695 B2 | 10/2008 | Hormadaly | |
| 7,452,489 B2 | 11/2008 | Sawai et al. | |
| 7,602,121 B2 | 10/2009 | Aitken et al. | |
| 7,736,546 B2 | 6/2010 | Prunchak | |
| 8,227,055 B2 | 7/2012 | Wang | |
| 8,500,933 B2 | 8/2013 | Cooper | |
| 8,506,738 B2 | 8/2013 | Wang et al. | |
| 8,766,524 B2 * | 7/2014 | Kohara ............ C03C 8/04 313/480 |
| 8,802,203 B2 | 8/2014 | Dennis | |
| 2002/0035852 A1 | 3/2002 | Wang et al. | |
| 2004/0043887 A1 | 3/2004 | Paulson | |
| 2004/0207314 A1 | 10/2004 | Aitken et al. | |
| 2005/0001545 A1 | 1/2005 | Aitken et al. | |
| 2005/0110168 A1 | 5/2005 | Chuang | |
| 2005/0191515 A1 | 9/2005 | Brese et al. | |
| 2005/0233885 A1 | 10/2005 | Yoshida et al. | |
| 2006/0003883 A1 | 1/2006 | Yoshida et al. | |
| 2006/0042748 A1 | 3/2006 | Hasegawa et al. | |
| 2006/0128549 A1 | 6/2006 | Hormadaly | |
| 2007/0158021 A1 | 7/2007 | Sawai et al. | |
| 2007/0194304 A1 | 8/2007 | Zu et al. | |
| 2008/0300126 A1 | 12/2008 | Goedeke et al. | |
| 2009/0064717 A1 | 3/2009 | Son et al. | |
| 2009/0136766 A1 | 5/2009 | Son et al. | |
| 2009/0151854 A1 | 6/2009 | Cooper | |
| 2009/0151855 A1 | 6/2009 | Wang et al. | |
| 2009/0297862 A1 | 12/2009 | Boek et al. | |
| 2010/0180934 A1 | 7/2010 | Naito et al. | |
| 2010/0275654 A1 | 11/2010 | Wang | |
| 2010/0330308 A1 | 12/2010 | Cooper et al. | |
| 2011/0130264 A1 | 6/2011 | Beall | |
| 2012/0128904 A1 | 5/2012 | Masuda et al. | |
| 2012/0210750 A1 | 8/2012 | Cooper et al. | |
| 2012/0211146 A1 | 8/2012 | Dennis | |
| 2012/0213952 A1 | 8/2012 | Dennis | |
| 2012/0213953 A1 | 8/2012 | Dennis | |
| 2012/0213954 A1 | 8/2012 | Dennis | |
| 2012/0304696 A1 | 12/2012 | Miller et al. | |
| 2012/0308747 A1 | 12/2012 | Dennis | |
| 2012/0321902 A1 * | 12/2012 | Kohara ............ C03C 8/04 428/428 |
| 2013/0074445 A1 | 3/2013 | Jones | |
| 2013/0153550 A1 | 6/2013 | Dear | |
| 2013/0153551 A1 | 6/2013 | Dear | |
| 2013/0292000 A1 | 11/2013 | Dennis et al. | |
| 2013/0302542 A1 | 11/2013 | Jones | |
| 2013/0305785 A1 | 11/2013 | Dennis | |
| 2013/0306222 A1 | 11/2013 | Dennis | |
| 2013/0309425 A1 | 11/2013 | Dennis | |
| 2013/0333748 A1 * | 12/2013 | Naito et al. .................. 136/252 |

FOREIGN PATENT DOCUMENTS

| | | |
|---|---|---|
| DE | 195 45 422 | 6/1997 |
| EP | 0 013 650 | 7/1980 |
| EP | 0 061 183 | 9/1982 |
| EP | 0 889 010 | 1/1999 |
| EP | 1 065 183 | 1/2001 |
| EP | 1 281 329 | 3/2003 |
| EP | 1 571 134 | 9/2005 |
| EP | 2 017 236 | 1/2009 |
| EP | 2 187 444 | 5/2010 |
| EP | 2 308 806 | 3/2011 |
| EP | 1 595 856 | 11/2015 |
| JP | 63-55098 | 4/1988 |
| JP | 02-267137 | 10/1990 |
| JP | 05-85490 | 4/1993 |
| JP | 06-263478 | 9/1994 |
| JP | 2002-137939 | 5/2002 |
| JP | 2002-241143 | 8/2002 |
| JP | 2005-112715 | 4/2005 |
| JP | 2006-524419 | 10/2006 |
| JP | 2006-342044 | 12/2006 |
| JP | 2007-182347 | 7/2007 |

(56) References Cited

FOREIGN PATENT DOCUMENTS

| | | |
|---|---|---|
| JP | 2008-127240 | 6/2008 |
| JP | 2009-221049 | 10/2009 |
| JP | 2009221047 | * 10/2009 |
| JP | 2009221048 | * 10/2009 |
| JP | 2009-298673 | 12/2009 |
| JP | 2010-057893 | 3/2010 |
| KR | 10-2010-0004572 | 1/2010 |
| SU | 852811 | 8/1981 |
| SU | 1 578 093 | 7/1990 |
| SU | 1590472 | 9/1990 |
| SU | 1694561 | 11/1991 |
| SU | 1791433 | 1/1993 |
| WO | WO 96/02473 | 2/1996 |
| WO | WO 96/22255 | 7/1996 |
| WO | WO 99/11580 | 3/1999 |
| WO | WO 02/14640 | 2/2002 |
| WO | WO 02/27135 | 4/2002 |
| WO | WO 2004/074198 | 9/2004 |
| WO | WO 2004/095597 | 11/2004 |
| WO | WO 2006/044383 | 4/2006 |
| WO | WO 2011/108115 | 9/2011 |
| WO | WO 2012/035565 | 3/2012 |
| WO | WO 2012/073662 | 6/2012 |
| WO | WO 2012/115796 | 8/2012 |
| WO | WO 2013/043340 | 3/2013 |
| WO | WO 2013/101748 | 7/2013 |

OTHER PUBLICATIONS

International Search Report dated Oct. 2, 2012.
International Search Report dated May 29, 2012.
U.S. Appl. No. 12/929,874, filed Feb. 22, 2011; Dennis.
U.S. Appl. No. 12/929,876, filed Feb. 22, 2011; Cooper et al.
"Laser Sintering of Thick-Film Conductors for Microelectronic Applications", Kinzel et al.
"Pb-Free Vanadium-Based Low-Melting Glass Paste: VS-1026"; Hitachi Powered Metals Technical Report No. 7, (2008).
U.S. Appl. No. 12/000,663, filed Dec. 14, 2007; Cooper.
U.S. Appl. No. 12/000,791, filed Dec. 17, 2007, Wang et al.
U.S. Appl. No. 12/453,221, filed May 1, 2009; Wang.
U.S. Appl. No. 12/458,071, filed Jun. 30, 2009; Cooper et al.
International Search Report dated Apr. 9, 2009.
International Search Report dated Jul. 8, 2010.
International Search Report dated Mar. 18, 2009.
U.S. Appl. No. 13/238,358, filed Sep. 21, 2011; Dennis.
U.S. Appl. No. 13/480,987, filed May 25, 2012; Dennis.
U.S. Appl. No. 13/339,463, filed Dec. 29, 2011; Dennis.
Collins; Design of Support Pillar Arrays in Flat Evacuated Windows, Aust. J. Phys. 1991,44 pp. 545-563.
Empower Materials: MSDS for QPAC 25 (7pgs).
Empower Materials: MSDS for QPAC 40 (7pgs).
Empower Materials: Binders for Glass Powders & Substrate (1 pg).
U.S. Appl. No. 14/172,432, filed Feb. 4, 2014; Hogan et al.
U.S. Appl. No. 13/354,963, filed Jan. 20, 2012; Dennis.
U.S. Appl. No. 13/628,653, filed Sep. 27, 2012.
Simko, et al., "Temperature-Induced Stresses in Vacuum Glazing Modelling and Experimental Validation," Solar Energy, vol. 63, No. 1, 1998 (21 pages).
Lenzen, et al., "Thermal Outgassing of Vacuum Glazing," School of Physics, The University of Syndey, 1999 (31 pages).
U.S. Appl. No. 13/562,386, filed Jul. 31, 2012; Petrmichl, et al.
U.S. Appl. No. 13/562,408, filed Jul. 31, 2012; Hogan, et al.
U.S. Appl. No. 13/562,423, filed Jul. 31, 2012; Petrmichl, et al.
RU Application No. 2013142948 Official Decision to Grant issued Feb. 1, 2017.

* cited by examiner

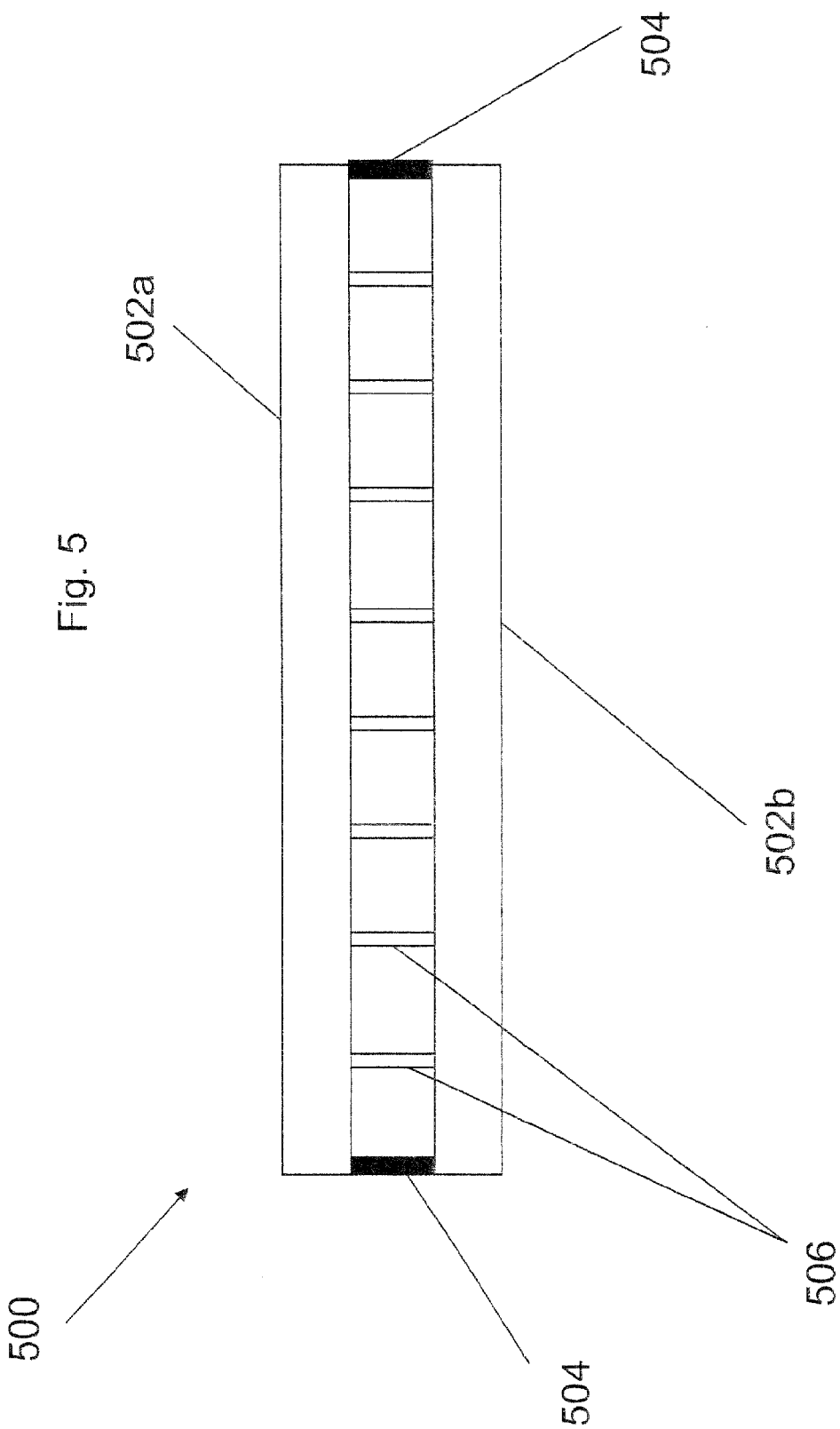

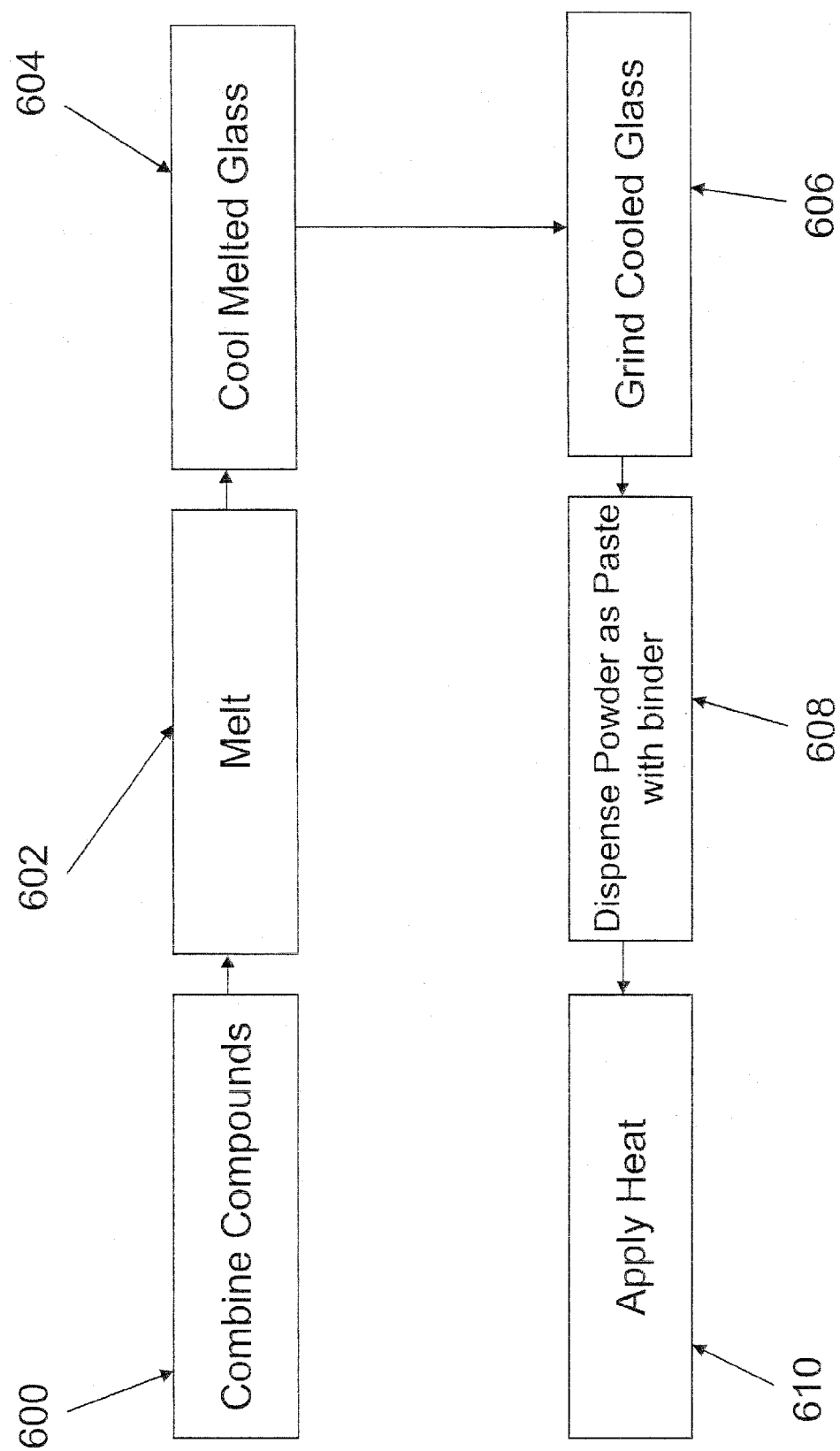

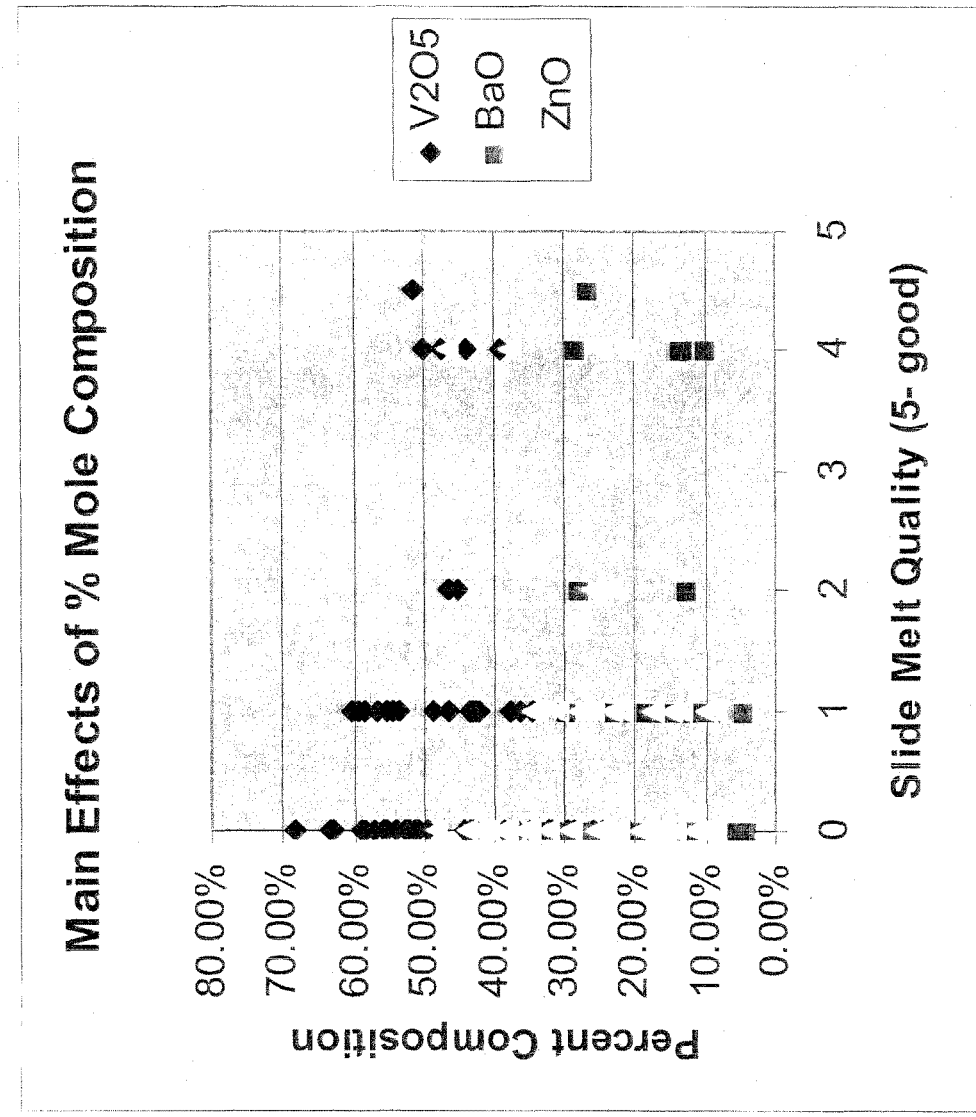

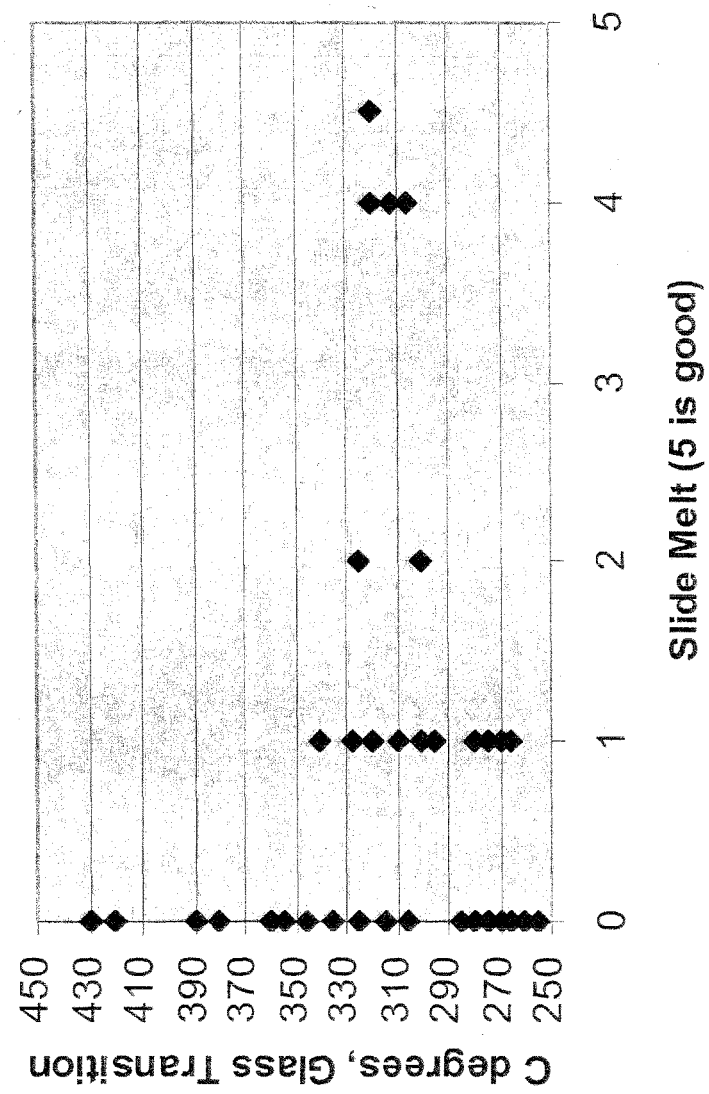

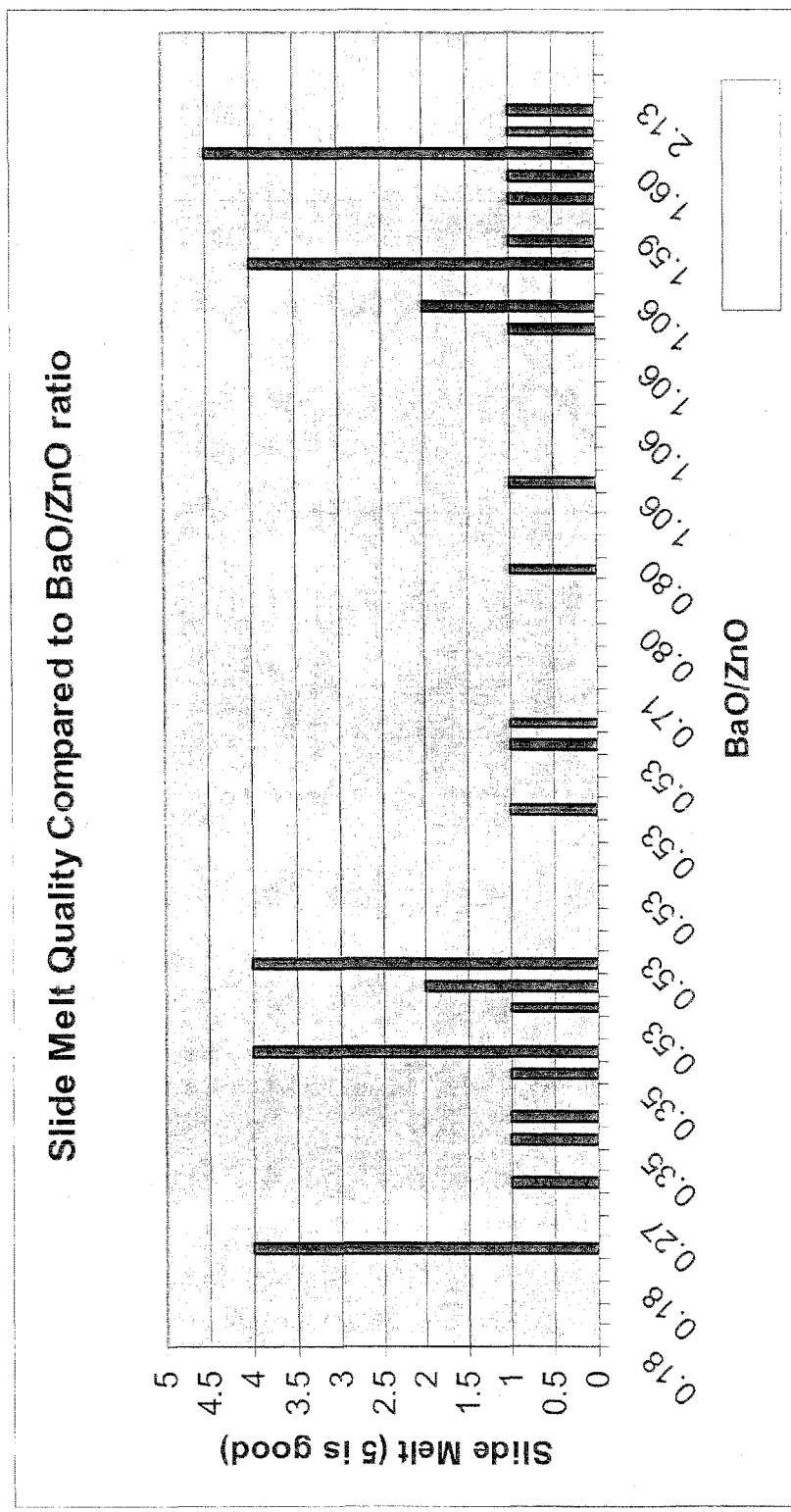

VANADIUM-BASED FRIT MATERIALS, AND/OR METHODS OF MAKING THE SAME

This application is a division of application Ser. No. 12/929,875 Feb. 22, 2011 (now U.S. Pat. No. 8,802,203), the entire disclosure of which is hereby incorporated herein by reference in this application.

FIELD OF THE INVENTION

Certain example embodiments of this invention relate to improved frit materials for glass articles (e.g., for use in vacuum insulated glass or VIG units), and/or methods of making the same, as well as articles including such improved frit materials and/or methods of making the same. More particularly, certain example embodiments relate to vanadium-based frit materials having a reduced melting point, and/or methods of making the same. In certain example embodiments, the improved insulated seals are used in connection with vacuum insulated glass (VIG) units, and/or a method is provided for sealing VIG units with the improved seals.

BACKGROUND AND SUMMARY OF EXAMPLE EMBODIMENTS OF THE INVENTION

Vacuum IG units are known in the art. For example, see U.S. Pat. Nos. 5,664,395, 5,657,607, and 5,902,652, the disclosures of which are all hereby incorporated herein by reference.

FIGS. 1-2 illustrate a conventional vacuum IG unit (vacuum IG unit or VIG unit). Vacuum IG unit 1 includes two spaced apart glass substrates 2 and 3, which enclose an evacuated or low pressure space 6 there between. Glass sheets/substrates 2 and 3 are interconnected by peripheral or edge seal of fused solder glass 4 and an array of support pillars or spacers 5.

Pump out tube 8 is hermetically sealed by solder glass 9 to an aperture or hole 10 which passes from an interior surface of glass sheet 2 to the bottom of recess 11 in the exterior face of sheet 2. A vacuum is attached to pump out tube 8 so that the interior cavity between substrates 2 and 3 can be evacuated to create a low pressure area or space 6. After evacuation, tube 8 is melted to seal the vacuum. Recess 11 retains sealed tube 8. Optionally, a chemical getter 12 may be included within recess 13.

Conventional vacuum IG units, with their fused solder glass peripheral seals 4, have been manufactured as follows. Glass frit in a solution (ultimately to form solder glass edge seal 4) is initially deposited around the periphery of substrate 2. The other substrate 3 is brought down over top of substrate 2 so as to sandwich spacers 5 and the glass frit/solution there between. The entire assembly including sheets 2, 3, the spacers, and the seal material is then heated to a temperature of approximately 500° C., at which point the glass frit melts, wets the surfaces of the glass sheets 2, 3, and ultimately forms hermetic peripheral or edge seal 4. This approximately 500° C. temperature is maintained for from about one to eight hours. After formation of the peripheral/edge seal 4 and the seal around tube 8, the assembly is cooled to room temperature. It is noted that column 2 of U.S. Pat. No. 5,664,395 states that a conventional vacuum IG processing temperature is approximately 500° C. for one hour. Inventors Lenzen, Turner and Collins of the '395 patent have stated that "the edge seal process is currently quite slow: typically the temperature of the sample is increased at 200° C. per hour, and held for one hour at a constant value ranging from 430° C. and 530° C. depending on the solder glass composition." After formation of edge seal 4, a vacuum is drawn via the tube to form low pressure space 6.

The composition of conventional edge seals are known in the art. See, for example, U.S. Pat. Nos. 3,837,866; 4,256,495; 4,743,302; 5,051,381; 5,188,990; 5,336,644; 5,534,469; 7,425,518, and U.S. Publication No. 2005/0233885, the disclosures of which are all hereby incorporated herein by reference.

Unfortunately, the aforesaid high temperatures and long heating times of the entire assembly utilized in the formulation of edge seal 4 are undesirable. This is especially the case when it is desired to use a heat strengthened or tempered glass substrate(s) 2, 3 in the vacuum IG unit. As shown in FIGS. 3-4, tempered glass loses temper strength upon exposure to high temperatures as a function of heating time. Moreover, such high processing temperatures may adversely affect certain low-E coating(s) that may be applied to one or both of the glass substrates in certain instances.

FIG. 3 is a graph illustrating how fully thermally tempered plate glass loses original temper upon exposure to different temperatures for different periods of time, where the original center tension stress is 3,200 MU per inch. The x-axis in FIG. 3 is exponentially representative of time in hours (from 1 to 1,000 hours), while the y-axis is indicative of the percentage of original temper strength remaining after heat exposure. FIG. 4 is a graph similar to FIG. 3, except that the x-axis in FIG. 4 extends from zero to one hour exponentially.

Seven different curves are illustrated in FIG. 3, each indicative of a different temperature exposure in degrees Fahrenheit (° F.). The different curves/lines are 400° F. (across the top of the FIG. 3 graph), 500° F., 600° F., 700° F., 800° F., 900° F., and 950° F. (the bottom curve of the FIG. 3 graph). A temperature of 900° F. is equivalent to approximately 482° C., which is within the range utilized for forming the aforesaid conventional solder glass peripheral seal 4 in FIGS. 1-2. Thus, attention is drawn to the 900° F. curve in FIG. 3, labeled by reference number 18. As shown, only 20% of the original temper strength remains after one hour at this temperature (900° F. or 482° C.). Such a significant loss (i.e., 80% loss) of temper strength may be undesirable.

As seen in FIGS. 3-4, the percentage of remaining tempering strength varies based on the temperature that is exposed to the tempered glass. For example, at 900° F. only about 20% of the original temper strength remains. When the temperature that the sheet is exposed to is reduced to 800° F., about 428° C., the amount of strength remaining is about 70%. Finally, a reduction in temperature to about 600° F., about 315° C., results in about 95% of the original temper strength of the sheet remaining. As will be appreciated, it is desirable to reduce any temper strength losses as a result of exposing a tempered sheet of glass to high temperatures.

As noted above, the creation of VIG units includes the creation of a hermetic seal that can withstand the pressure applied from the vacuum created on inside of the unit. As also discussed above, the creation of the seal may conventionally involve temperatures of at or above 500° C. These temperatures are required in order to obtain a high enough temperature in order for the frit material used for the seal to melt and form the required seal for the VIG units. As shown above, such a temperature can result in a strength reduction for VIG units using tempered glass.

One conventional solution to sealing glass substrates together is to use an epoxy. However, in the case of VIG units, epoxy compositions may be insufficient to hold a seal on a vacuum. Furthermore, epoxies may be susceptible to environmental factors that may further reduce their effectiveness when applied to VIG units.

Another conventional solution is to use a frit solution that contains lead. As is known, lead has a relatively low melting point. Accordingly, temperatures for sealing the VIG units may not need to be as high for other frit materials, and thus the tempering strength of tempered glass substrates may not be reduced by the same amount required for other frit based materials. However, while lead based frits may resolve the above structural issues, the usage of lead in the frit may create new problems. Specifically, the health consequences to the population for products that contain lead. Additionally, certain countries (e.g., in the European Union) may impose strict requirements on the amount of lead that can be contained in a given product. Indeed, some countries (or customers) may require products that are completely lead-free.

Thus, it will be appreciated that techniques for creating improved seals for glass articles are continuously sought after. It also will be appreciated that there exists a need in the art for improved seals and the like that can be integrated with tempered glass units, such as, for example, VIG units. The seals may be designed to allow for reduced temperature sealing such that annealed or tempered glass can be sealed without detrimental impact on the properties of the glass.

In certain example embodiments, a frit material having a composition is provided. The frit material may include vanadium oxide between about 50% and 60% weight, barium oxide between about 27% and 33% weight, and zinc oxide between about 9% and 12% weight. In certain example embodiments, the frit material may also include at least one additive selected from among: $Ta_2O_5$, $Ti_2O_3$, $SrCl_2$, $GeO_2$, $CuO$, $AgO$, $Nb_2O_5$, $B_2O_3$, $MgO$, $SiO_2$, $TeO_2$, $Tl_2O_3$, $Y_2O_3$, $SnF_2$, $SnO_2$, $CuCl$, $SnCl_2$, $CeO_2$, $AgCl$, $In_2O_3$, $SnO$, $SrO$, $MgO$, and $Al_2O_3$.

In certain example embodiments, a vacuum insulted glass (VIG) unit is provided. The VIG unit may include first and second substantially parallel, spaced apart glass substrates. An edge seal is provided around a periphery of the first and second substrates to form a hermetic seal there between and at least partially defining a gap between the first and second substrates. The gap defined between the first and second substrates is at a pressure less than atmospheric. The edge seal includes a frit material, e.g., as made from a base composition as described herein.

In certain example embodiments, a method of making a frit material is provided. A base composition is provided to a holder. The base composition includes vanadium oxide between about 50% and 60% weight, barium oxide between about 27% and 33% weight, zinc oxide between about 9% and 12% weight, and at least one additive selected from among: $Ta_2O_5$, (about 4.5-10 wt. %), $Ti_2O_3$, $SrCl_2$, $GeO_2$, $CuO$, $AgO$, $Nb_2O_5$, (e.g., about 2-8 wt. %), $B_2O_3$, $MgO$, $SiO_2$, $TeO_2$, $Tl_2O_3$, $Y_2O_3$, $SnF_2$, $SnO_2$, $CuCl$, $SnCl_2$, $CeO_2$, $AgCl$, $In_2O_3$, $SnO$, $SrO$, $MgO$, and $Al_2O_3$. The base composition is melted. The base composition is cooled or allowed to cool, forming an intermediate glass article. The intermediate glass article is ground to make the frit material.

In certain example embodiments, a method of making a vacuum insulated glass (VIG) unit is provided. First and second glass substrates in substantially parallel, spaced apart relation to one another are provided. The first and second glass substrates using a frit material are sealed together, with a gap being defined between the first and second substrates. The sealing being performed by melting the frit material at a temperature of no more than about 375 degrees C. Where the frit material has been formed from a base composition including vanadium oxide between about 50% and 60% weight, barium oxide between about 27% and 33% weight, zinc oxide between about 9% and 12% weight, and at least one oxide or chloride-base additive.

In certain example embodiments, a frit material having a composition is provided. The frit material may include vanadium oxide between about 50% and 60% weight, barium oxide between about 27% and 33% weight, and zinc oxide between about 9% and 12% weight. The frit material includes at least a first and second additive selected from among $SiO_2$, $SnCl_2$, $Al_2O_3$, and $TeO_2$.

Certain example embodiments may include at least two additives. For example $SnCl_2$ and $SiO_2$. Certain example embodiments may include three or four additives selected from among $SiO_2$, $SnCl_2$, $Al_2O_3$, and $TeO_2$.

The features, aspects, advantages, and example embodiments described herein may be combined in any suitable combination or sub-combination to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which:

FIG. 5 is cross-sectional view of a vacuum insulated glass unit according to certain example embodiments;

FIG. 6 is a flowchart illustrating a process for making a vacuum insulated glass unit with a frit material according to certain example embodiments;

FIGS. 7A-7D are graphs summarizing properties of compositions according to certain example embodiments;

DETAILED DESCRIPTION OF EXAMPLE EMBODIMENTS OF THE INVENTION

Figure 2:
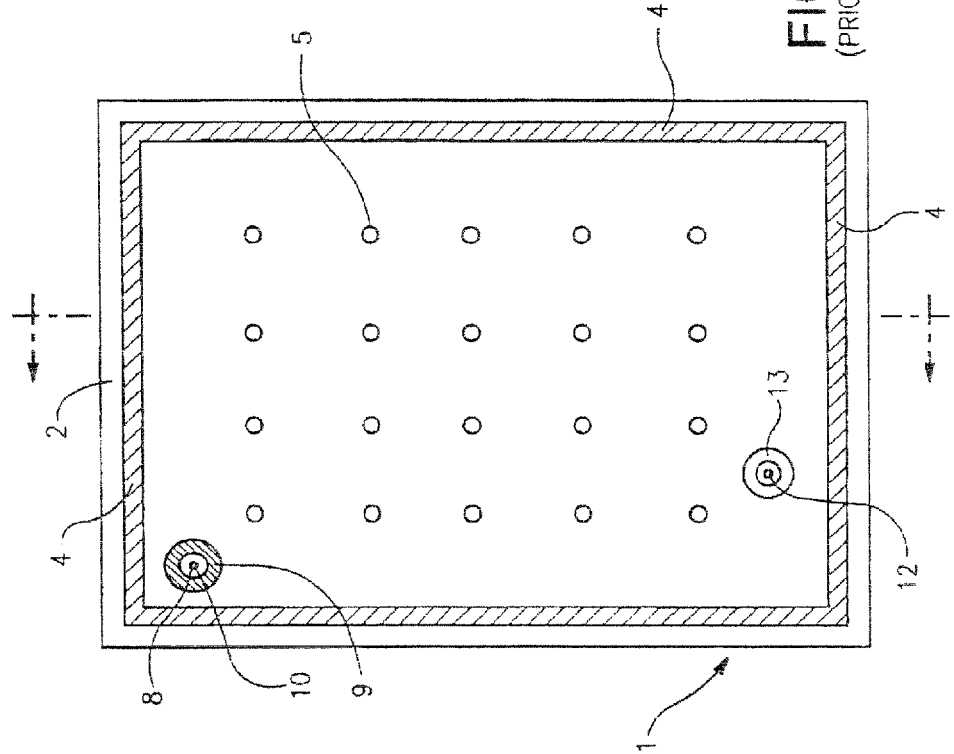
FIG. 2 is a top plan view of the bottom substrate, edge seal, and spacers of the FIG. 1 vacuum IG unit taken along the section line illustrated in FIG. 1.
Figure 1:
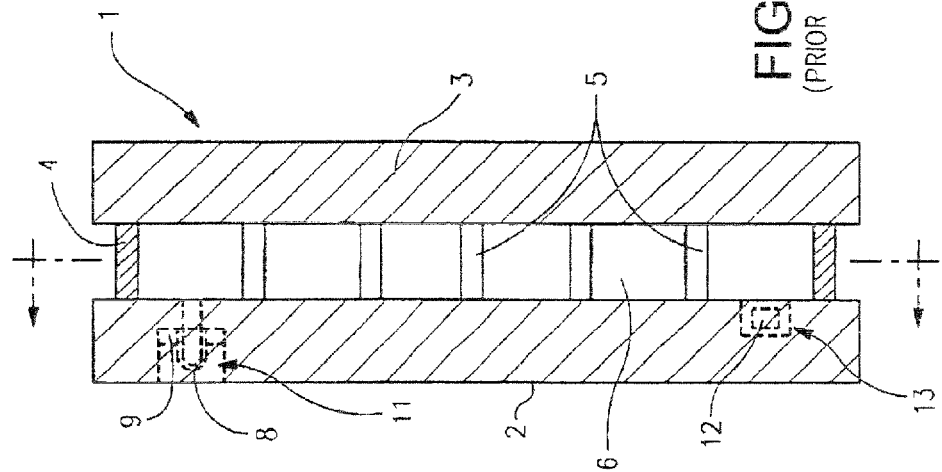
FIG. 1 is a cross-sectional view of a conventional vacuum IG unit.
Figure 3:
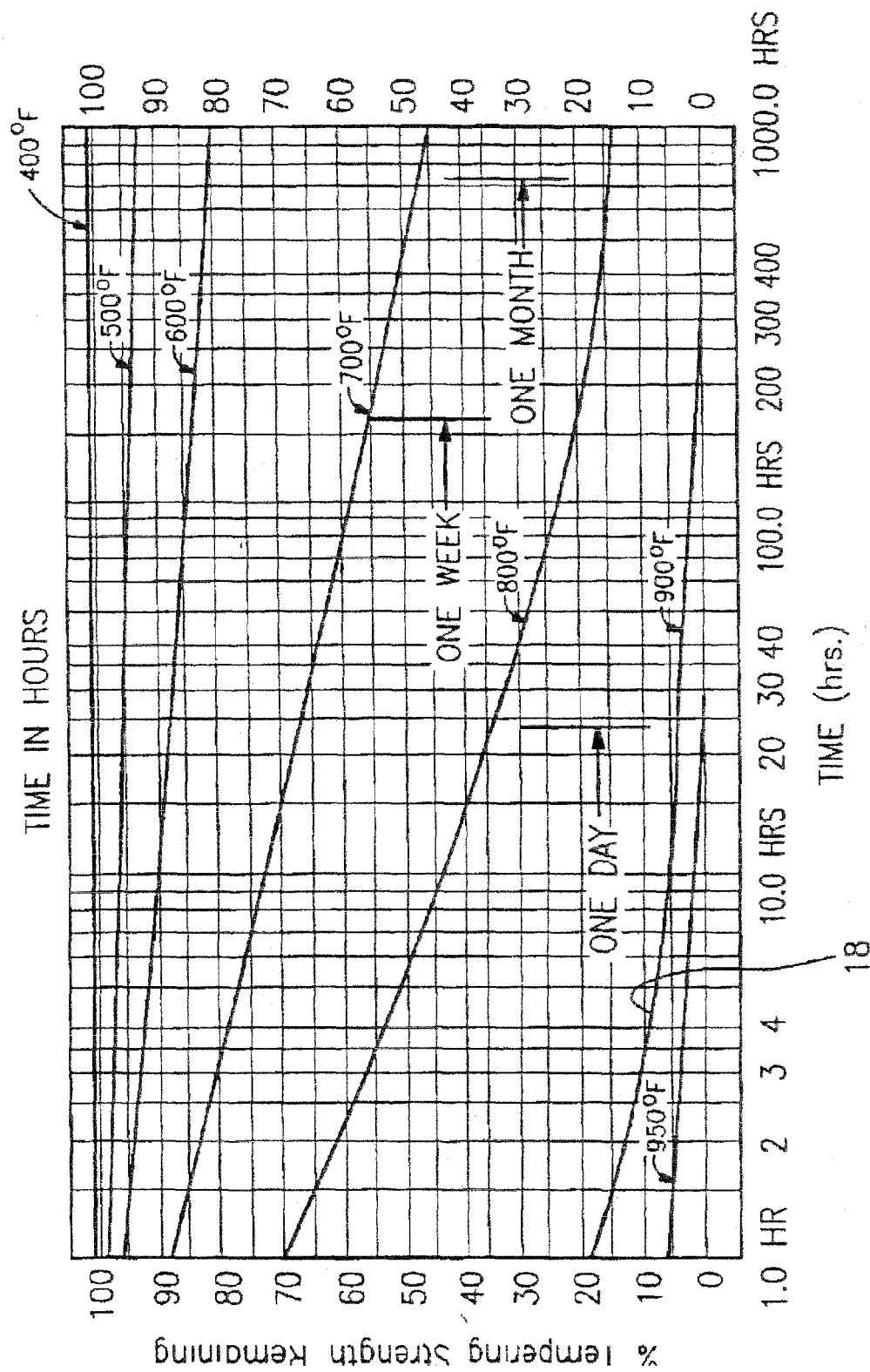
FIG. 3 is a graph correlating time (hours) versus percent tempering strength remaining, illustrating the loss of original temper strength for a thermally tempered sheet of glass after exposure to different temperatures for different periods of time.

The following description is provided in relation to several example embodiments which may share common characteristics, features, etc. It is to be understood that one or more features of any one embodiment may be combinable with one or more features of other embodiments. In addition, single features or a combination of features may constitute an additional embodiment(s).

Certain example embodiments may relate to glass units (e.g., VIG units) that include two glass substrates sealed with an improved seal, e.g., of or including a vanadium-based frit material. In certain example embodiments an improved seal may include the following materials: vanadium oxide, barium oxide, and zinc oxide. In addition, certain example embodiments may include one or more of the following compounds: $Ta_2O_5$, $Ti_2O_3$, $SrCl_2$, $GeO_2$, $CuO$, $AgO$, $Nb_2O_5$, $B_2O_3$, $MgO$, $SiO_2$, $TeO_2$, $Tl_2O_3$, $Y_2O_3$, $SnF_2$, $SnO_2$, $CuCl$, $SnCl_2$, $CeO_2$, $AgCl$, $In_2O_3$, $SnO$, $SrO$, $MgO$, and $Al_2O_3$.

FIG. 5 is cross-sectional view of a vacuum insulated glass unit according to certain example embodiments. VIG unit 500 may include first and second glass substrates 502a and 502b that are spaced apart and define a space therebetween. The glass substrates 502a and 502b may be connected via an improved seal 504, of or including a vanadium-based frit. Support pillars 506 may help maintain the first and second substrates 502a and 502b in substantially parallel spaced apart relation to one another. It will be appreciated that the CTE of the improved seal 504 and the glass substrates 502a and 502b may substantially match one another. This may be advantageous in terms of reducing the likelihood of the glass cracking, etc. Although FIG. 5 is described in relation to a VIG unit, it will be appreciated that the improved seal 504, of or including a vanadium-based frit may be used in connection with other articles and/or arrangements including, for example, insulating glass (IG) units and/or other articles.

FIG. 6 is a flowchart illustrating a process for preparing a frit material to be used in making a vacuum insulated glass unit according to certain example embodiments. In step 600, base compounds are combined and disposed into an appropriate container (e.g., a heat resistant container such as, for example, a ceramic container). In step 602, the combined compound is melted. Preferably, the temperature to melt the combined material may be at least 1000° C. In certain exemplary embodiments, the combined compound is melted at 1000° C. for between 30 to 60 minutes. In certain exemplary embodiments, the combined compound is melted at 1100° C. for 60 minutes. In certain exemplary embodiments, the combined compound is melted at 1200° C. for 60 minutes. In certain exemplary embodiments, the melting temperature is a cycle that includes 500° C. for 15 minutes. 550° C. for 15minutes, 600° C. for 15 minutes, and a ramp up to 1000° C. for 60 minutes.

After the combined compounds are melted, the material may be cooled in step 604, e.g., to form a glass sheet. After cooling, the glass may be crushed or ground into fine particulates in step 606. In certain example embodiments, the size of the particulates may be no larger than about 100 mesh. Once the glass is ground into a powder, it may be disposed between the substrates in step 608. In certain example embodiments, the powder may be dispensed as a paste with a binder. Heat may then be applied in step 610 to the glass substrate and the powder. In certain example embodiments, the heat may be between 300° C. and 400° C., or more preferably between 325° C. and 375° C. It will be appreciated that when heat of the above temperatures is applied to tempered glass that the tempered glass may lose a reduced amount of strength versus when heat of in excess of 350° C. is applied to the tempered glass. Thus, certain example embodiments preferably involve a frit melting temperature of less than 500° C., more preferably less than 425° C., and sometimes less than 350° C.

In certain example embodiments, the combined compounds include the following materials: vanadium oxide, barium oxide, and zinc oxide.

FIGS. 7A-7D show graphs summarizing properties of compositions according to certain example embodiments.

The table below corresponds to the data shown in FIG. 7A with those compositions with a melt quality of less than 4 (on a scale of 0 to 5) omitted from the table.

TABLE 1

Normalized Moles of Batch Composition

| $V_2O_5$ | BaO | ZnO | BaO/ZnO | $Bi_2O_3$ | $B_2O_3$ | Tg(C.) | Tx1(C.) | Rating |
|---|---|---|---|---|---|---|---|---|
| 43.66% | 9.87% | 46.47% | 0.21 | | | 320 | 410 | 4 |
| 39.01% | 13.25% | 37.37% | .35 | 2.18% | 8.20% | 312 | 430 | 4 |
| 47.33% | 12.96% | 24.41% | 0.53 | 9.95% | 5.53% | 305 | 380 | 4 |
| 50.24% | 23.38% | 21.39% | 1.33 | | | 320 | 425 | 4 |
| 51.54% | 26.26% | 16.46% | 1.60 | 5.75% | | 320 | 410 | 4.5 |

Figure 7B:
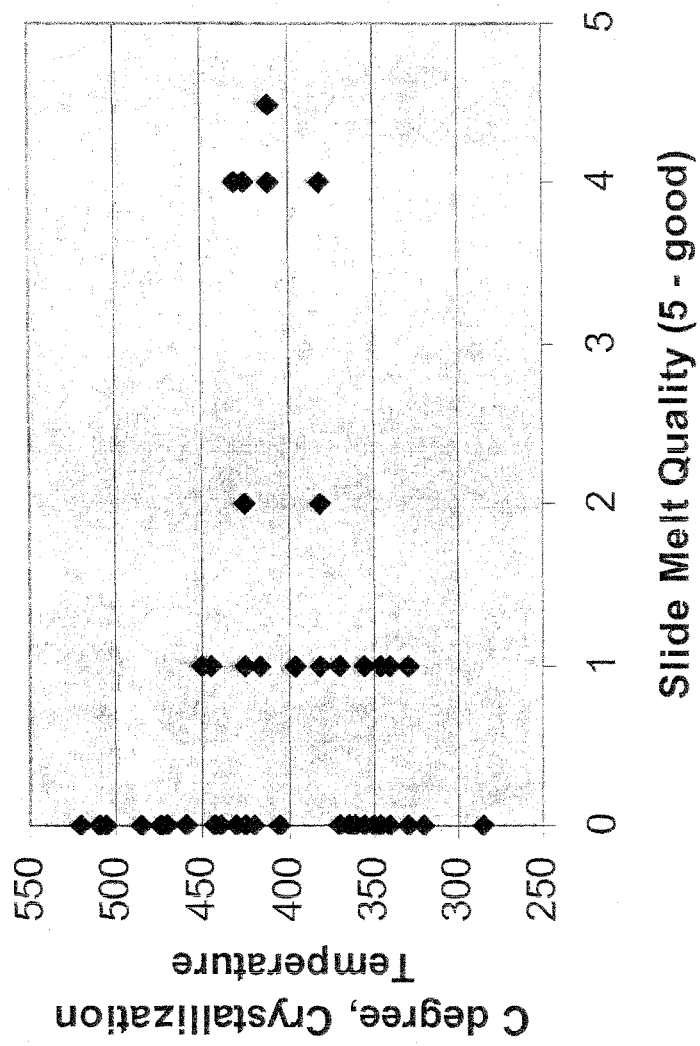

The melts shown in FIG. 7A were applied to a microscope glass slide with a temperature of 375° C. applied for 15 minutes. FIG. 7B shows a graph that includes the crystallization temperature (first crystallization peak—Tx1—of the above table) of the above melts. According to certain exemplary embodiments, a preferred temperature for Tx1 may be between about 375° C. and 425° C., preferably about 400° C.

FIG. 7C shows the transition glass temperatures, Tg, compared the above melts. The graph showing exemplary data shows that Tg values between about 290 C and 335 C may be preferred for the above compositions.

FIG. 7D includes the above melts in a graph showing the melt quality versus the barium/zinc ratio.

Figure 8A:
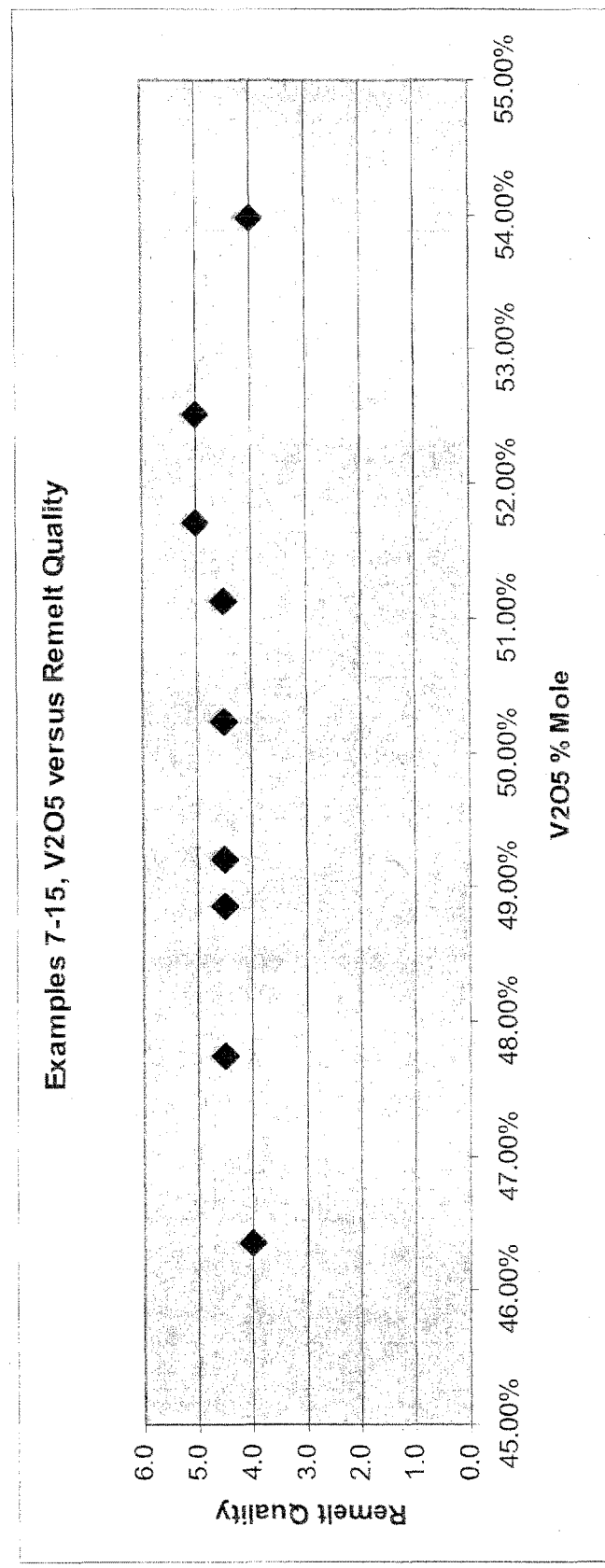
FIGS. 8A-8C are graphs summarizing the quality of compositions according to certain exemplary embodiments.
Figure 8B:
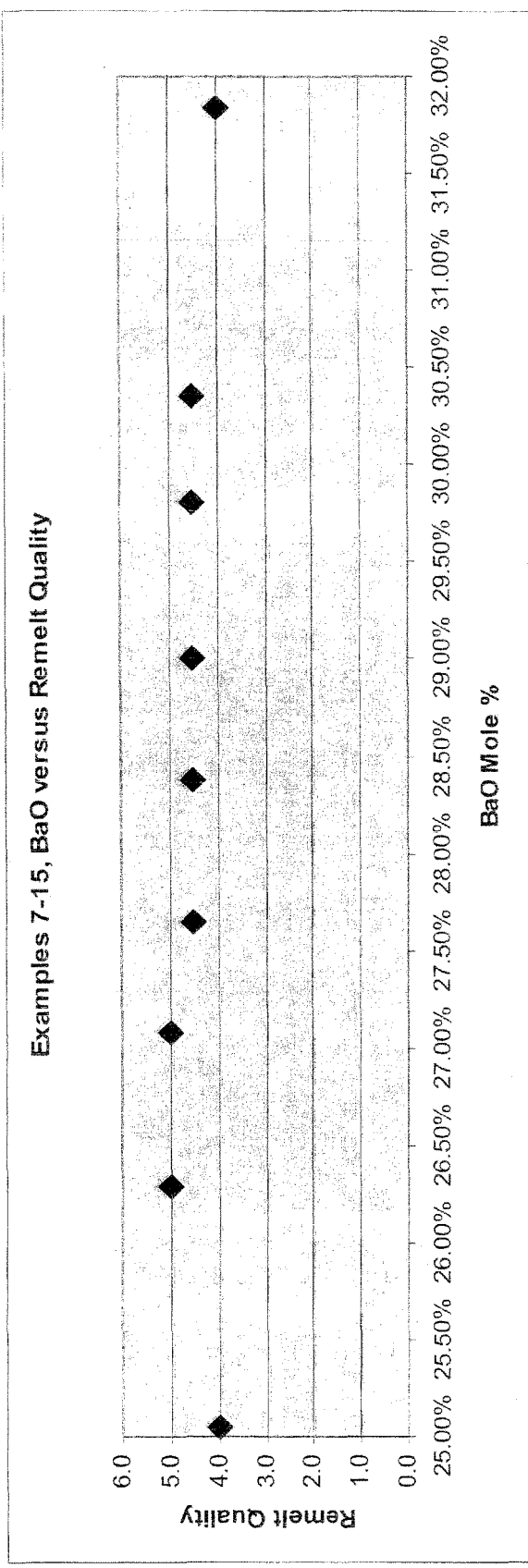
Figure 8C:
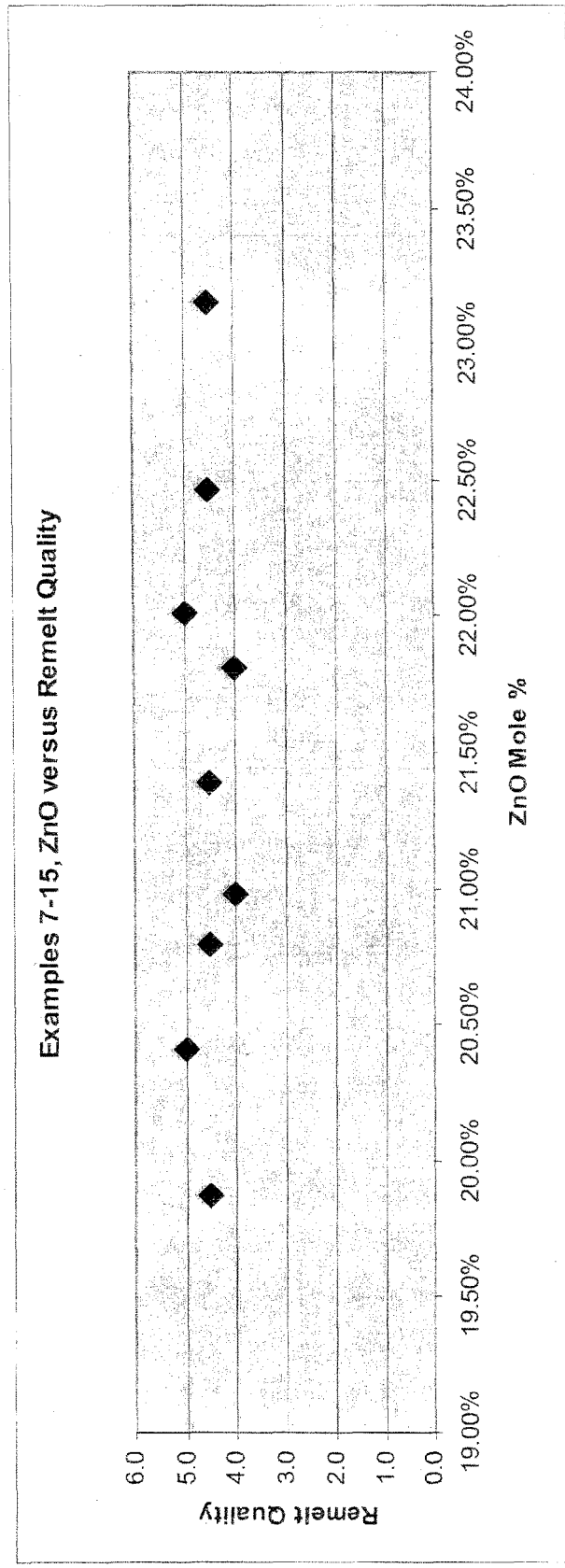

FIGS. 8A-8C show graphs that summarize the quality of compositions according to certain exemplary embodiments. FIG. 8A summarizes the $V_2O_5$ percentage used in certain exemplary compositions. FIG. 8B summarizes the BaO percentage used in certain exemplary compositions. FIG. 8C summarizes the ZnO percentage used in certain exemplary compositions. As shown in the illustrative graphs, a vanadium percentage of between about 51% and 53% may be preferable according to certain example embodiments.

Below, tables 2A-2C show exemplary compositions according to certain example embodiments. Additionally, examples 7-15 in the tables correspond to graphs 8A-8C, For the compositions shown in the below tables, $BaCO_3$ factor of 1.287027979 was used to convert to a BaO resulting compound.

TABLE 2A

| | Weight Percentage | | | Weight Normal | Weights of Batch Composition for 25 grams | | | Normalized Weight Percentage | | |
|---|---|---|---|---|---|---|---|---|---|---|
| Ex. | $V_2O_5$ | BaO | ZnO | | $V_2O_5$ | BaO | ZnO | $V_2O_5$ | BaO | ZnO |
| 1 | 60 | 30 | 10 | 0.23 | 13.800 | 8.880 | 2.300 | 55.24 | 35.55 | 9.21 |
| 2 | 52.5 | 25 | 10 | 0.27 | 14.175 | 8.687 | 2.700 | 55.45 | 33.99 | 10.56 |
| 3 | 45 | 20 | 10 | 0.31 | 13.950 | 7.980 | 3.100 | 55.73 | 31.88 | 12.39 |
| 4 | 45 | 10 | 20 | 0.32 | 14.400 | 4.118 | 6.400 | 57.79 | 16.53 | 25.68 |
| 5 | 52.5 | 10 | 25 | 0.28 | 14.700 | 3.604 | 7.000 | 58.09 | 14.24 | 27.66 |
| 6 | 60 | 10 | 30 | 0.25 | 15.000 | 3.218 | 7.500 | 58.33 | 12.51 | 29.16 |
| 7 | 52.5 | 25 | 10 | 0.24 | 12.600 | 7.722 | 2.400 | 55.45 | 33.99 | 10.56 |
| 8 | 57.5 | 25 | 10 | 0.25 | 14.375 | 8.044 | 2.500 | 57.69 | 32.28 | 10.03 |
| 9 | 47.5 | 25 | 10 | 0.28 | 13.300 | 9.009 | 2.800 | 52.97 | 35.88 | 11.15 |
| 10 | 52.5 | 27.5 | 10 | 0.26 | 13.650 | 9.202 | 2.600 | 53.63 | 36.15 | 10.22 |
| 11 | 57.5 | 27.5 | 10 | 0.25 | 14.375 | 8.848 | 2.500 | 55.88 | 34.40 | 9.72 |
| 12 | 47.5 | 27.5 | 10 | 0.27 | 12.825 | 9.556 | 2.700 | 51.13 | 38.10 | 10.77 |
| 13 | 52.5 | 22.5 | 10 | 0.28 | 14.700 | 8.108 | 2.800 | 57.40 | 31.66 | 10.93 |
| 14 | 57.5 | 22.5 | 10 | 0.26 | 14.950 | 7.529 | 2.600 | 59.61 | 30.02 | 10.37 |
| 15 | 47.5 | 22.5 | 10 | 0.29 | 13.775 | 8.398 | 2.900 | 54.94 | 33.49 | 11.57 |

TABLE 2B

| | Moles of Batch | | | Normalized Moles | | | Glass Type |
|---|---|---|---|---|---|---|---|
| Ex. | $V_2O_5$ | BaO | ZnO | $V_2O_5$ | BaO | ZnO | |
| 1 | 0.3037 | 0.1801 | 0.1132 | 50.87% | 30.17% | 18.95% | amorphous |
| 2 | 0.3049 | 0.1722 | 0.1298 | 50.24% | 28.38% | 21.39% | glassy |
| 3 | 0.3064 | 0.1616 | 0.1522 | 49.41% | 26.05% | 24.54% | amorphous |
| 4 | 0.3177 | 0.0838 | 0.3156 | 44.31% | 11.68% | 44.01% | amorphous |
| 5 | 0.3194 | 0.0722 | 0.3400 | 43.66% | 9.87% | 46.47% | amorphous |
| 6 | 0.3207 | 0.0634 | 0.3584 | 43.19% | 8.54% | 48.27% | amorphous |
| 7 | 0.3049 | 0.1722 | 0.1298 | 50.24% | 28.38% | 21.39% | glassy |
| 8 | 0.3172 | 0.1636 | 0.1233 | 52.51% | 27.08% | 20.41% | glassy |
| 9 | 0.2912 | 0.1818 | 0.1370 | 47.74% | 29.80% | 22.46% | glassy |
| 10 | 0.2949 | 0.1832 | 0.1255 | 48.85% | 30.35% | 20.80% | glassy |
| 11 | 0.3073 | 0.1743 | 0.1194 | 51.12% | 29.00% | 19.87% | glassy |
| 12 | 0.2811 | 0.1931 | 0.1323 | 46.35% | 31.83% | 21.81% | glassy |
| 13 | 0.3156 | 0.1604 | 0.1344 | 51.70% | 26.28% | 22.01% | glassy |
| 14 | 0.3278 | 0.1521 | 0.1274 | 53.97% | 25.05% | 20.98% | glassy |
| 15 | 0.3021 | 0.1697 | 0.1421 | 49.20% | 27.65% | 23.15% | glassy |

TABLE 2C

| Example | Tg (C. °) | Tx2 (C. °) | Tx2 (C. °) | Tx1 − Tg | Rating |
|---|---|---|---|---|---|
| 1 | 280 | 330 | 540 | 50 | 0.0 |
| 2 | 320 | 425 | 525 | 105 | 4.0 |
| 3 | 280 | 430 | 550 | 150 | 0.0 |
| 4 | 280 | 320 | 365 | 40 | 0.0 |
| 5 | 320 | 410 | 560 | 90 | 4.0 |
| 6 | 285 | 425 | 560 | 140 | 0.0 |
| 7 | 315 | 390 | 530 | 75 | 4.5 |
| 8 | 295, 325 | 415 | 535 | 90 | 5.0 |
| 9 | 320 | 420 | 525 | 100 | 4.5 |
| 10 | 325 | 410 | 540 | 85 | 4.5 |
| 11 | 315 | 395 | 530 | 80 | 4.5 |
| 12 | 330 | 415 | 560 | 85 | 4.0 |
| 13 | 315 | 400 | 530 | 85 | 5.0 |
| 14 | 305 | 395 | 530 | 90 | 4.0 |
| 15 | 320 | 395 | 525 | 75 | 4.5 |

The rating shown in Table 2C is based off of deposing the ground composition on a microscope glass slide and heating the composition at about 375° C. for between 10 and 30 minutes.

Figure 9:
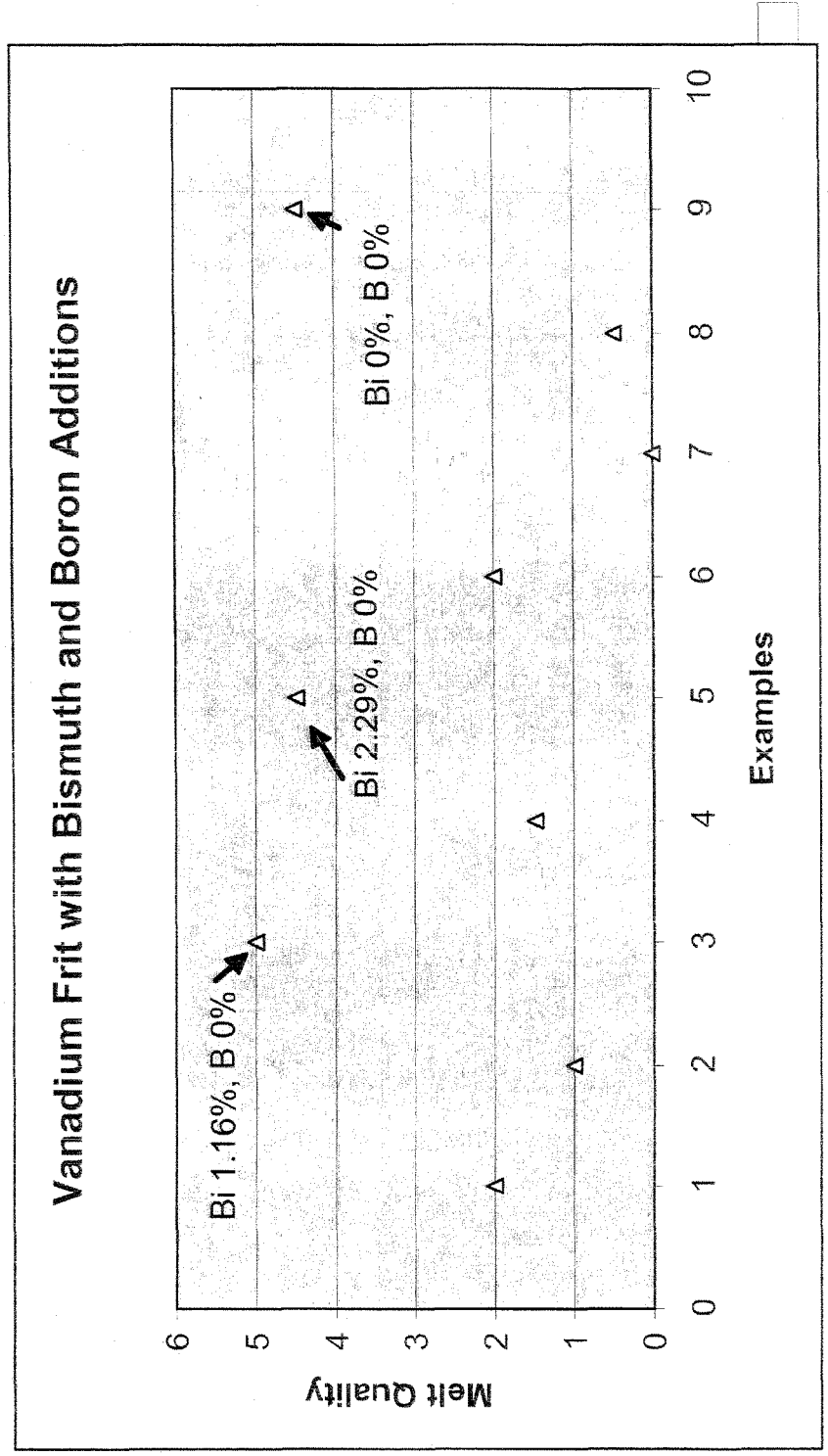
FIG. 9 is a graph showing results when additional elements are added to compositions according to certain example embodiments.

FIG. 9 shows a graph with results of adding additional elements (e.g., $Bi_2O_3$ and $B_2O_3$) to a vanadium based fit. Corresponding data shown in FIG. 9 is also displayed below in Table 3.

TABLE 3

| Ex. | $V_2O_5$ | BaO | ZnO | $Bi_2O_3$ | $B_2O_3$ | Tg(C.) | Tx1(C.) | DSC Responses |
|---|---|---|---|---|---|---|---|---|
| 1 | 65.39% | 14.87% | 12.46% | 0.00% | 7.28% | 320 | 430 | medium weak |
| 2 | 60.96% | 13.86% | 11.61% | 0.00% | 13.57% | 240 | 415 | very weak |
| 3 | 69.71% | 15.85% | 13.28% | 1.16% | 0.00% | 315 | 405 | strong peaks |
| 4 | 64.69% | 14.71% | 12.32% | 1.08% | 7.20% | 325 | 440 | very weak |
| 5 | 68.91% | 15.67% | 13.13% | 2.29% | 0.00% | 320 | 410 | medium weak |
| 6 | 64.00% | 14.56% | 12.19% | 2.13% | 7.12% | 320 | 425 | very weak |
| 7 | 59.74% | 13.59% | 11.38% | 1.99% | 13.30% | 315 | 410 | very weak |
| 8 | 60.34% | 13.72% | 11.49% | 1.00% | 13.43% | 315 | 400 | very weak |
| 9 | 70.53% | 16.04% | 13.43% | 0.00% | 0.00% | 315 | 380 | strong peaks |

In certain example embodiments, a strong DSC response may correspond to a good remelt quality. In certain example embodiments, the addition of bismuth in concentrations of between about 0% and 3% may result in increased remelt flow quality.

In certain example embodiments, a frit that includes $V_2O_5$, BaO, and ZnO May further include one or more additives. In certain example embodiments, the additives may be between about 0.5% and 15% weight. According to certain example embodiments, the additives may be added to a base composition that includes between about 50% and 60% weight $V_2O_5$, 27% and 33% weight BaO, and 9% and 12% weight ZnO.

Figure 10A:
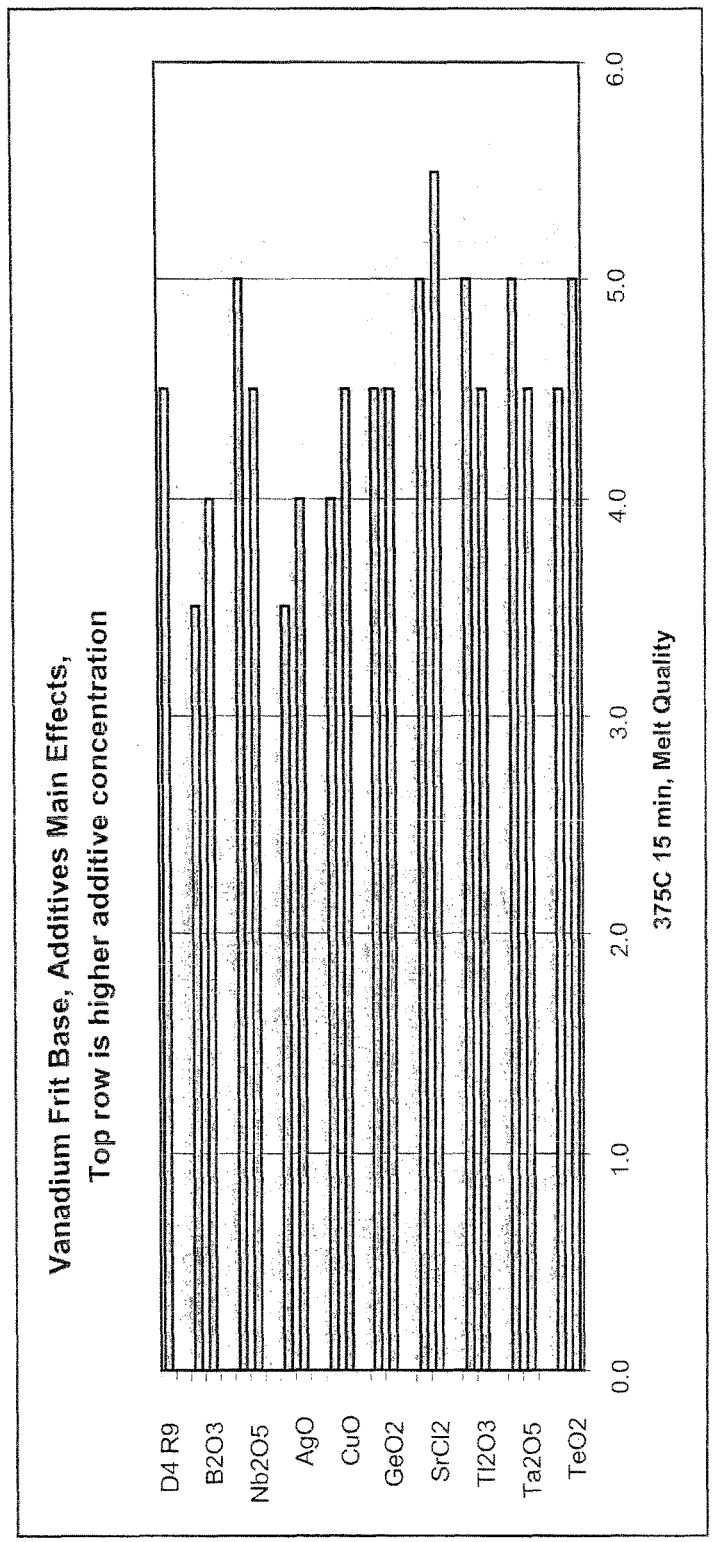
FIGS. 10A-10C show graphs summarizing impacts of additives being added to vanadium based frits according to certain example embodiments.
Figure 10B:
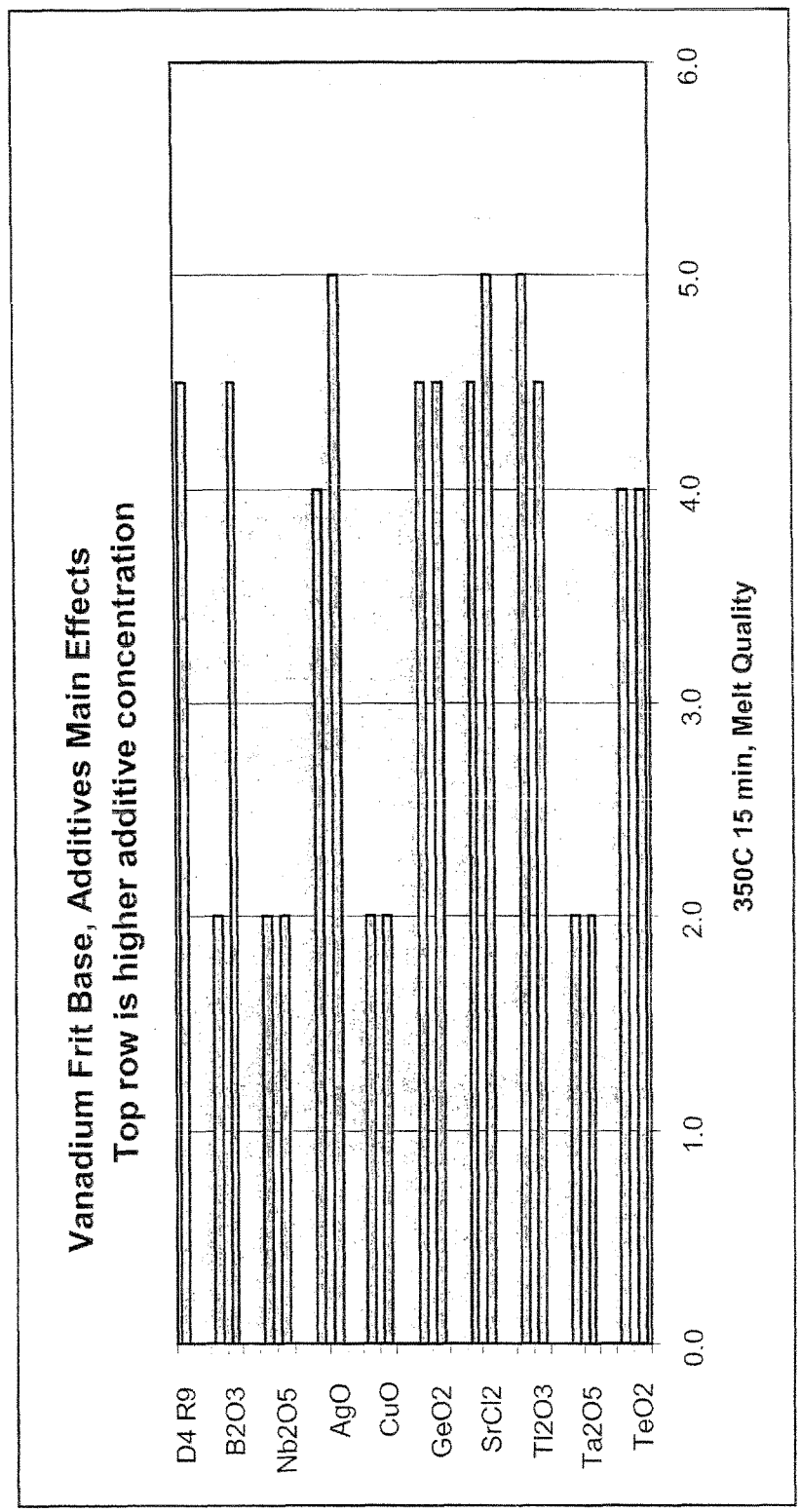
Figure 10C:
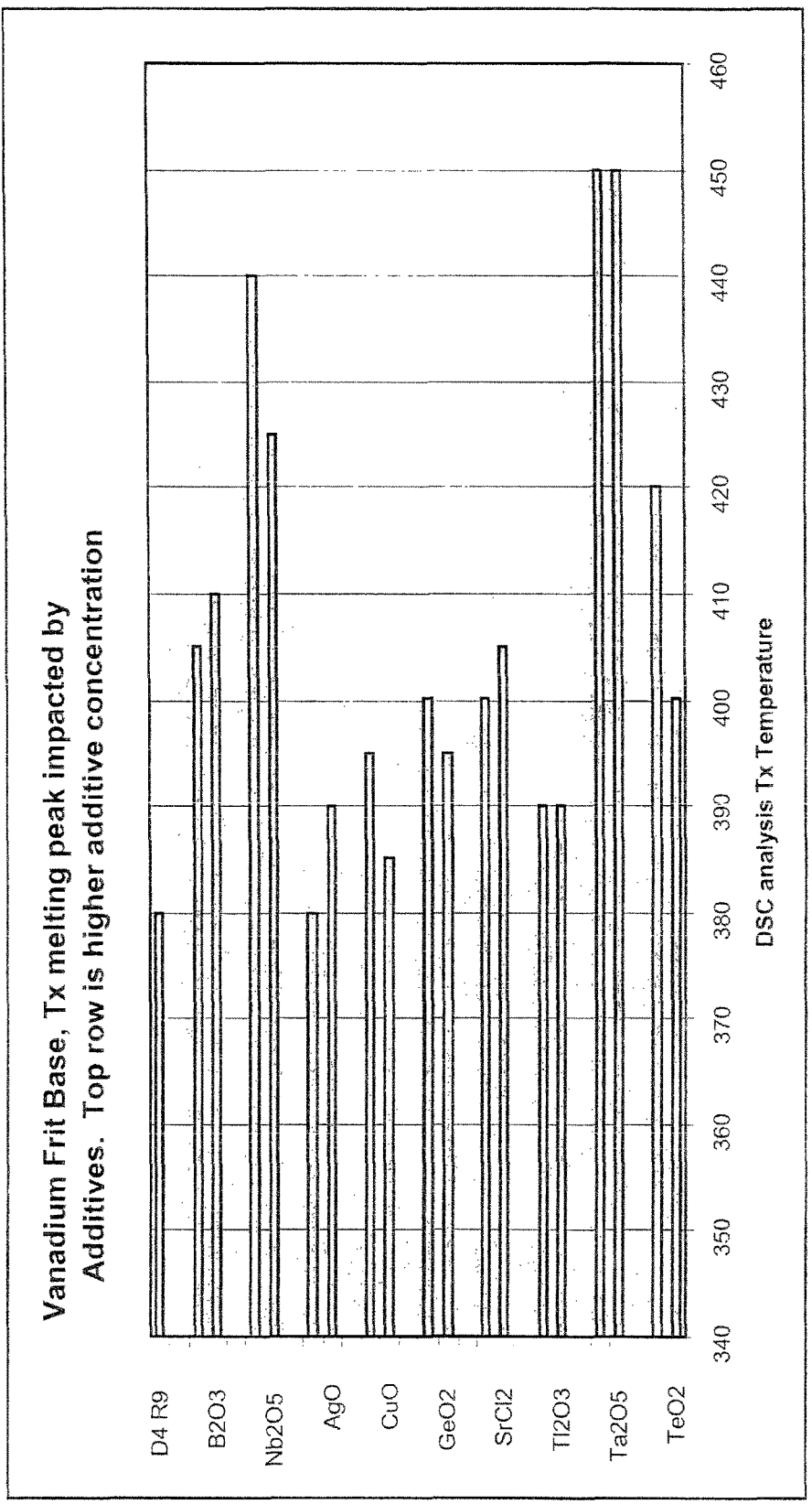

Below, Tables 4A-4D show results of including additives to the base composition of $V_2O_5$, BaO, and ZnO. Table 4D shows the melt quality on a scale of about 0 to 5 for each of the compositions. FIGS. 10A-10C show graphs corresponding to the data shown in the below tables. A $BaCO_3$ factor of 1.2870 was used to form the BaO used for the following examples.

TABLE 4A

| | Weights (gm) | | | | | Normalized Weights | | | |
|---|---|---|---|---|---|---|---|---|---|
| Ex | $V_2O_5$ | BaO | ZnO | Additive Type | Amount | $V_2O_5$ | BaO | ZnO | Additive |
| 1 | 52.5 | 22.5 | 10 | $TeO_2$ | 2 | 14.175 | 7.819 | 2.700 | 0.540 |
| 2 | 52.5 | 22.5 | 10 | $TeO_2$ | 4 | 13.650 | 7.529 | 2.600 | 1.040 |
| 3 | 52.5 | 22.5 | 10 | $Ta_2O_5$ | 5 | 13.650 | 7.529 | 2.600 | 1.300 |
| 4 | 52.5 | 22.5 | 10 | $Ta_2O_5$ | 10 | 13.125 | 7.240 | 2.500 | 2.500 |
| 5 | 52.5 | 22.5 | 10 | $Ti_2O_3$ | 5 | 13.650 | 7.529 | 2.600 | 1.300 |
| 6 | 52.5 | 22.5 | 10 | $Ti_2O_3$ | 10 | 13.125 | 7.240 | 2.500 | 2.500 |
| 7 | 52.5 | 22.5 | 10 | $SrCl_2$ | 2 | 14.175 | 7.819 | 2.700 | 0.540 |
| 8 | 52.5 | 22.5 | 10 | $SrCl_2$ | 4 | 13.650 | 7.529 | 2.600 | 1.040 |
| 9 | 52.5 | 22.5 | 10 | $GeO_2$ | 1 | 14.175 | 7.819 | 2.700 | 0.270 |
| 10 | 52.5 | 22.5 | 10 | $GeO_2$ | 2 | 14.175 | 7.819 | 2.700 | 0.540 |
| 11 | 52.5 | 22.5 | 10 | CuO | 1 | 14.175 | 7.819 | 2.700 | 0.270 |
| 12 | 52.5 | 22.5 | 10 | CuO | 2 | 14.175 | 7.819 | 2.700 | 0.540 |
| 13 | 52.5 | 22.5 | 10 | AgO | 1.5 | 14.175 | 7.819 | 2.700 | 0.405 |
| 14 | 52.5 | 22.5 | 10 | AgO | 3 | 14.175 | 7.819 | 2.700 | 0.810 |
| 15 | 52.5 | 22.5 | 10 | $Nb_2O_5$ | 3 | 14.175 | 7.819 | 2.700 | 0.810 |
| 16 | 52.5 | 22.5 | 10 | $Nb_2O_5$ | 6 | 13.650 | 7.529 | 2.600 | 1.560 |
| 17 | 52.5 | 22.5 | 10 | $B_2O_3$ | .8 | 14.175 | 7.819 | 2.700 | 0.216 |
| 18 | 52.5 | 22.5 | 10 | $B_2O_3$ | 1.6 | 14.175 | 7.819 | 2.700 | 0.432 |

TABLE 4B

| | Normalized Weight Percentage | | | | Moles of Batch Composition | | | |
|---|---|---|---|---|---|---|---|---|
| Ex | $V_2O_5$ | BaO | ZnO | Additive | $V_2O_5$ | BaO | ZnO | Additive |
| 1 | 56.17 | 30.99 | 10.70 | 2.14 | 0.309 | 0.157 | 0.131 | 0.013 |
| 2 | 55.00 | 30.34 | 10.48 | 4.19 | 0.302 | 0.154 | 0.129 | 0.026 |
| 3 | 54.43 | 30.02 | 10.37 | 5.18 | 0.299 | 0.152 | 0.127 | 0.012 |
| 4 | 51.75 | 28.54 | 9.86 | 9.86 | 0.285 | 0.145 | 0.121 | 0.022 |
| 5 | 54.43 | 30.02 | 10.37 | 5.18 | 0.299 | 0.152 | 0.127 | 0.011 |
| 6 | 51.75 | 28.54 | 9.86 | 9.86 | 0.285 | 0.145 | 0.121 | 0.022 |
| 7 | 56.17 | 30.99 | 10.70 | 2.14 | 0.309 | 0.157 | 0.131 | 0.013 |
| 8 | 55.00 | 30.34 | 10.48 | 4.19 | 0.302 | 0.154 | 0.129 | 0.026 |
| 9 | 56.78 | 31.32 | 10.82 | 1.08 | 0.312 | 0.159 | 0.133 | 0.010 |
| 10 | 56.17 | 30.99 | 10.70 | 2.14 | 0.309 | 0.157 | 0.131 | 0.020 |
| 11 | 56.78 | 31.32 | 10.82 | 1.08 | 0.312 | 0.159 | 0.133 | 0.014 |
| 12 | 56.17 | 30.99 | 10.70 | 2.14 | 0.309 | 0.157 | 0.131 | 0.027 |
| 13 | 56.48 | 31.15 | 10.76 | 1.61 | 0.311 | 0.158 | 0.132 | 0.013 |
| 14 | 55.58 | 30.66 | 10.59 | 3.18 | 0.306 | 0.155 | 0.130 | 0.026 |
| 15 | 55.58 | 30.66 | 10.59 | 3.18 | 0.306 | 0.155 | 0.130 | 0.012 |
| 16 | 53.87 | 29.71 | 10.26 | 6.16 | 0.296 | 0.151 | 0.126 | 0.023 |
| 17 | 56.91 | 31.39 | 10.84 | 0.87 | 0.313 | 0.159 | 0.133 | 0.012 |
| 18 | 56.42 | 31.12 | 10.75 | 1.72 | 0.310 | 0.158 | 0.132 | 0.025 |

TABLE 4C

| | Normalized Moles | | | | | | | |
|---|---|---|---|---|---|---|---|---|
| Ex | $V_2O_5$ | BaO | ZnO | Additive | Tg (C.) | (Tx1 (C.) | Tx2 (C.) | Tx1 − Tg |
| 1 | 50.57% | 25.71% | 21.53% | 2.20% | 315 | 400 | 525 | 85 |
| 2 | 49.48% | 25.16% | 21.07% | 4.30% | 315 | 420 | 530 | 105 |
| 3 | 50.68% | 25.76% | 21.58% | 1.99% | 320 | 450 | | 130 |
| 4 | 49.69% | 25.26% | 21.16% | 3.90% | 320 | 450 | 530 | 130 |
| 5 | 50.71% | 25.78% | 21.59% | 1.92% | 305 | 390 | 495 | 85 |
| 6 | 49.75% | 25.29% | 21.18% | 3.77% | 295 | 390 | 470 | 95 |
| 7 | 50.56% | 25.70% | 21.53% | 2.21% | 315 | 405 | 530 | 90 |
| 8 | 49.47% | 25.15% | 21.06% | 4.32% | 315 | 400 | 530 | 85 |
| 9 | 50.83% | 25.84% | 21.64% | 1.68% | 315 | 395 | 530 | 80 |
| 10 | 49.99% | 25.41% | 21.28% | 3.31% | 315 | 400 | 530 | 85 |
| 11 | 50.56% | 25.71% | 21.53% | 2.20% | 315 | 385 | 525 | 70 |
| 12 | 49.47% | 25.15% | 21.06% | 4.31% | 320 | 395 | 545 | 75 |
| 13 | 50.61% | 25.73% | 21.55% | 2.12% | 305 | 390 | 525 | 85 |
| 14 | 49.55% | 25.19% | 21.10% | 4.16% | 300 | 380 | | 80 |
| 15 | 50.68% | 25.76% | 21.58% | 1.98% | 315 | 425 | 550 | 110 |
| 16 | 49.69% | 25.26% | 21.16% | 3.89% | 325 | 440 | 465 | 115 |
| 17 | 50.66% | 25.75% | 21.57% | 2.02% | 315 | 410 | 540 | 95 |
| 18 | 49.66% | 25.25% | 21.14% | 3.95% | 320 | 405 | 545 | 85 |

TABLE 4D

| Example | Melt Quality @ 375 C., 15 min | Melt Quality at 350 C., 15 min |
|---|---|---|
| 1 | 5.0 | 4.0 |
| 2 | 4.5 | 4.0 |
| 3 | 4.5 | 2.0 |
| 4 | 5.0 | 2.0 |
| 5 | 4.5 | 4.5 |
| 6 | 5.0 | 5.0 |
| 7 | 5.5+ | 5.0 |
| 8 | 5.0 | 4.5 |
| 9 | 4.5 | 4.5 |
| 10 | 4.5 | 4.5 |
| 11 | 4.5 | 2.0 |
| 12 | 4.0 | 2.0 |

TABLE 4D-continued

| Example | Melt Quality @ 375 C., 15 min | Melt Quality at 350 C., 15 min |
|---|---|---|
| 13 | 4.0 | 5.0 |
| 14 | 3.5 | 4.0 |
| 15 | 4.5 | 2.0 |
| 16 | 5.0 | 2.0 |
| 17 | 4.0 | 4.5 |
| 18 | 3.5 | 2.0 |

In certain example embodiments, the molar composition of an addiviate to a base composition higher than is shown in tables 4A-4D. Table 5A shows additives with an increased additive amount (on a % mole basis). The base composition used with the additive amount may be based on, for example, the base composition shown in Row 1 of Tables 4A-4D. The additives shown in Table 5, in the selected quantities displayed, may improve melt quality when compared to the above base composition. A melt type of Glassy indicates that a "button" of the compound melted onto a glass plate, forming a homogenous glassy structure. Sinter indicates that the compound (in a powder form) fused together, but remained in a powder form.

TABLE 5

| Example | Additive Type | Amount | Melt Type (350 C. for 20 minutes) | Adhesion to glass substrate. |
|---|---|---|---|---|
| 1 | CuCl | 4.00% | Glassy | No Stick |
| 2 | $SnCl_2$ | 3.99% | Glassy | No Stick |
| 3 | $SnCl_2$ | 5.99% | Glassy, Slight Flow | Slight stick |
| 4 | $SiO_2$ | 6.02% | More Glassy | No Stick |
| 5 | $Al_2O_3$ | 6.00% | Glassy | No Stick |
| 6 | $CeO_2$ | 4.00% | Sinter | No Stick |
| 7 | $TeO_2$ | 3.99% | Glassy | Slight stick |
| 8 | $TeO_2$ | 6.01% | Glassy | Slight stick |
| 9 | $Tl_2O_3$ | 3.99% | Glassy, Slight Flow | No Stick |
| 10 | $Tl_2O_3$ | 6.01% | Glassy, Slight Flow | No Stick |

Figure 4:
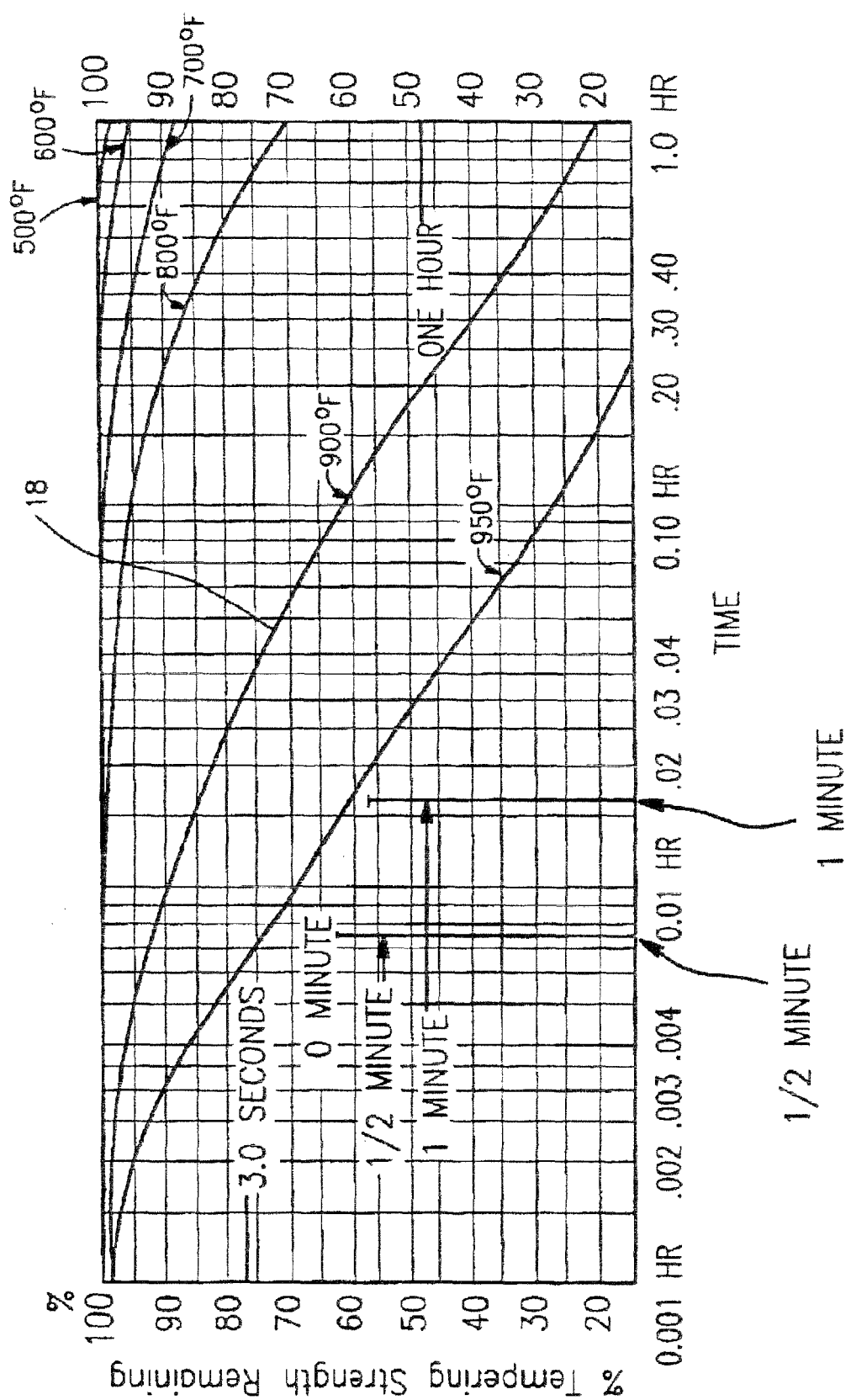
FIG. 4 is a graph correlating time versus percent tempering strength remaining similar to that of FIG. 3, except that a smaller time period is provided on the x-axis.

Accordingly, in certain example embodiments, additives of a relatively increased amount (e.g., versus those shown in FIG. 4) may be added to a base composition. In certain example embodiments, the additives may include, for example, CuCl, $SnCl_2$, $SiO_2$, $Al_2O_3$, and $TeO_2$. It will be appreciated that toxic nature of thallium oxide ($Tl_2O_3$) may preclude its use in certain instances.

In certain example embodiments, two or more additives may be included in a base compound. Table 6 shows the results of adding two additives to an exemplary base composition. Table 6 includes example melts at 375 and 350. Additionally, 13 mm buttons of the exemplary compounds were tested on a glass plate. The structural strength of the resulting exemplary compound are also shown in the far right column.

TABLE 6

| Ex | Add 1 | Add 2 | Amount 1 (Mole %) | Amount 2 (Mole %) | Melt Quality (375 C. 15-20 Min) | Melt Quality (350 C. 15-20 Min) | 13 mm Button 350 C. 20 Min | Strength |
|---|---|---|---|---|---|---|---|---|
| 1 | TeO2 | Al2O3 | 3.01 | 3.01 | 4.5 | 5.5 | glassy | Fractures |
| 2 | TeO2 | Al2O3 | 2.99 | 5.01 | 5 | 4 | glassy | Fractures |
| 3 | TeO2 | Al2O3 | 4.02 | 3.01 | 6 | 5.5 | glassy | Fractures |
| 4 | TeO2 | Al2O3 | 3.99 | 5.00 | 5 | 4.5 | glassy | Fractures |
| 5 | TeO2 | Al2O3 | 5.01 | 2.99 | 4.5 | 4.5 | glassy | Fractures |
| 6 | TeO2 | Al2O3 | 5.00 | 5.00 | 5 | 4.5 | glassy | Fractures |
| 7 | TeO2 | $SiO_2$ | 3.01 | 3.00 | 5 | 5.5 | glassy | Fractures |
| 8 | TeO2 | $SiO_2$ | 2.99 | 5.02 | 5 | 4.5 | glassy | Fractures |
| 9 | TeO2 | $SiO_2$ | 4.00 | 2.99 | 5 | 4 | glassy | Fractures |
| 10 | TeO2 | $SiO_2$ | 3.99 | 4.99 | 5 | 4.5 | Less glassy | Fractures |
| 11 | TeO2 | $SiO_2$ | 5.00 | 2.99 | 4.5 | 4.5 | Less glassy | Hard |
| 12 | TeO2 | $SiO_2$ | 5.00 | 4.99 | 4.5 | 4.5 | Less glassy | Hard |
| 13 | SnCl2 | Al2O3 | 3.01 | 3.01 | 5 | 6 | more glassy | Hard |
| 14 | SnCl2 | Al2O3 | 3.00 | 5.01 | 5 | 5.5 | glassy | Hard |
| 15 | SnCl2 | Al2O3 | 4.01 | 3.01 | 4.5 | 6 | glassy | Hard |
| 16 | SnCl2 | Al2O3 | 4.00 | 4.99 | 5.5 | 6 | glassy | Hard |
| 17 | SnCl2 | Al2O3 | 5.00 | 2.99 | 5.5 | 5.5 | glassy | Fractures |
| 18 | SnCl2 | Al2O3 | 5.00 | 5.00 | 5.5 | 5.5 | more glassy | Hard |
| 19 | SnCl2 | SiO2 | 3.00 | 3.00 | 4.5 | 4.5 | glassy | Hard |
| 20 | SnCl2 | SiO2 | 3.00 | 4.99 | 5 | 6 | glassy | Hard |
| 21 | SnCl2 | SiO2 | 4.00 | 2.99 | 6 | 6 | glassy | Fractures |
| 22 | SnCl2 | SiO2 | 4.01 | 4.99 | 5.5 | 5.5 | glassy | Fractures |
| 23 | SnCl2 | SiO2 | 5.00 | 2.99 | 5 | 5.5 | glassy | Hard |
| 24 | SnCl2 | SiO2 | 5.00 | 4.99 | 5.5 | 5.5 | glassy | Fractures |
| 25 | Al2O3 | SiO2 | 3.01 | 3.00 | 4.5 | 4 | less glassy | Hard |
| 26 | Al2O3 | SiO2 | 2.99 | 4.99 | 5 | 5.5 | less glassy | Hard |
| 27 | Al2O3 | SiO2 | 4.00 | 2.99 | 4.5 | 4.5 | less glassy | Hard |
| 28 | Al2O3 | SiO2 | 4.00 | 4.99 | 5 | 4.5 | less glassy | Hard |

TABLE 6-continued

| Ex | Add 1 | Add 2 | Amount 1 (Mole %) | Amount 2 (Mole %) | Melt Quality (375 C. 15-20 Min) | Melt Quality (350 C. 15-20 Min) | 13 mm Button 350 C. 20 Min | Strength |
|---|---|---|---|---|---|---|---|---|
| 29 | Al2O3 | SiO2 | 5.01 | 2.99 | 5 | 4.5 | less glassy | Hard |
| 30 | Al2O3 | SiO2 | 5.01 | 4.99 | 4 | 2 | less glassy | Hard |

Accordingly, certain example may include two additives similar to those found in examples 3, 16, and 21 as shown in Table 6 (e.g., $TeO_2$ with $SiO_2$, $SnCl_2$ with $Al_2O_3$, and $SnCl_2$ with $SiO_2$). In certain example embodiments, the addition of two or more additives may have beneficial results on an exemplary base composition. For example the addition of $SiO_2$ to another additive may increase the strength of the overall frit. Alternatively, or in addition, $TeO_2$ combined with other additives may increase the melt flow and glass wetting qualities of the frit when compared to a base frit.

In certain example embodiments, the combination of $SnCl_2$ with $SiO_2$ and/or $Al_2O_3$ may result in an increase in structural strength for the resulting frit material.

In certain example embodiments, one or more additives may be added to a base composition where the amount is between 1% and 10% by weight or between about 1% and 6% normalized moles for a hatch. In certain example embodiments, additives may be added in a smaller amount, for example between about 0.1% and 1% by weight. In certain example embodiments a batch for a base composition (in grams) may include $V_2O_5$ at 52.5, BaO at 22.5, ZnO at 10. In certain example embodiments, additives added to the above base composition may include: 1) TeO2 at 3.85 gm and Al2O3 at 1.84 gm; 2) SnCl2 at 4.65 gm and Al2O3 at 3.12 gm; 3) SnCl2 at 4.55 gm and SiO2 at 1.08 gm. Correspondingly, the additives may then have a normalize weight percentage of: 1) TeO2 at 1.00 and Al2O3 at 0.48; 2) SnCl2 at 1.21 and Al2O3 at 0.81; 3) SnCl2 at 1.18 and SiO2 at 0.28. These examples may correspond to examples 3, 16, and 21 in the above table 6.

Figure 11A:
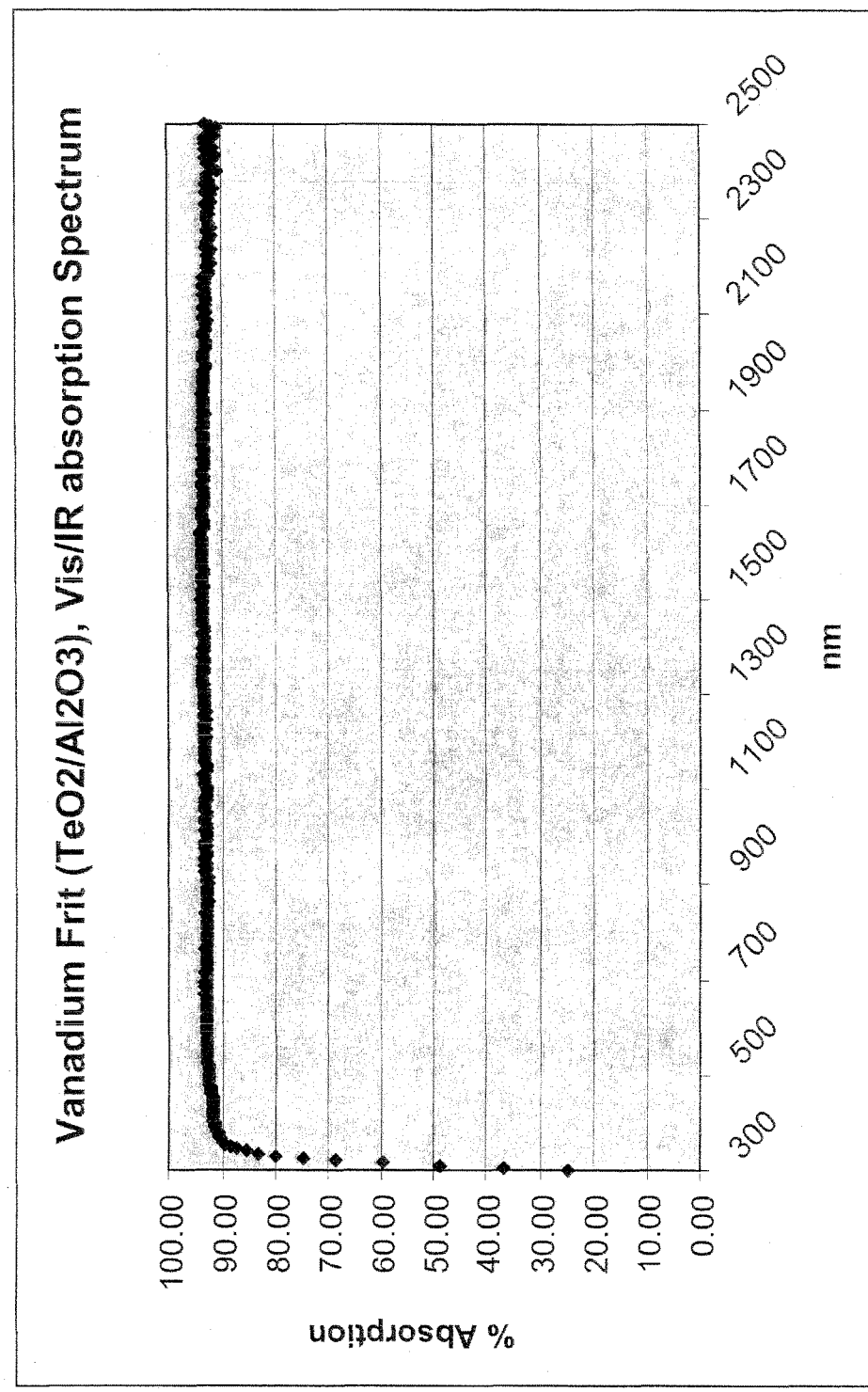
FIGS. 11A-11C show graphs summarizing absorption in the visible and infrared wavelengths for vanadium based frits according to certain example embodiments.
Figure 11B:
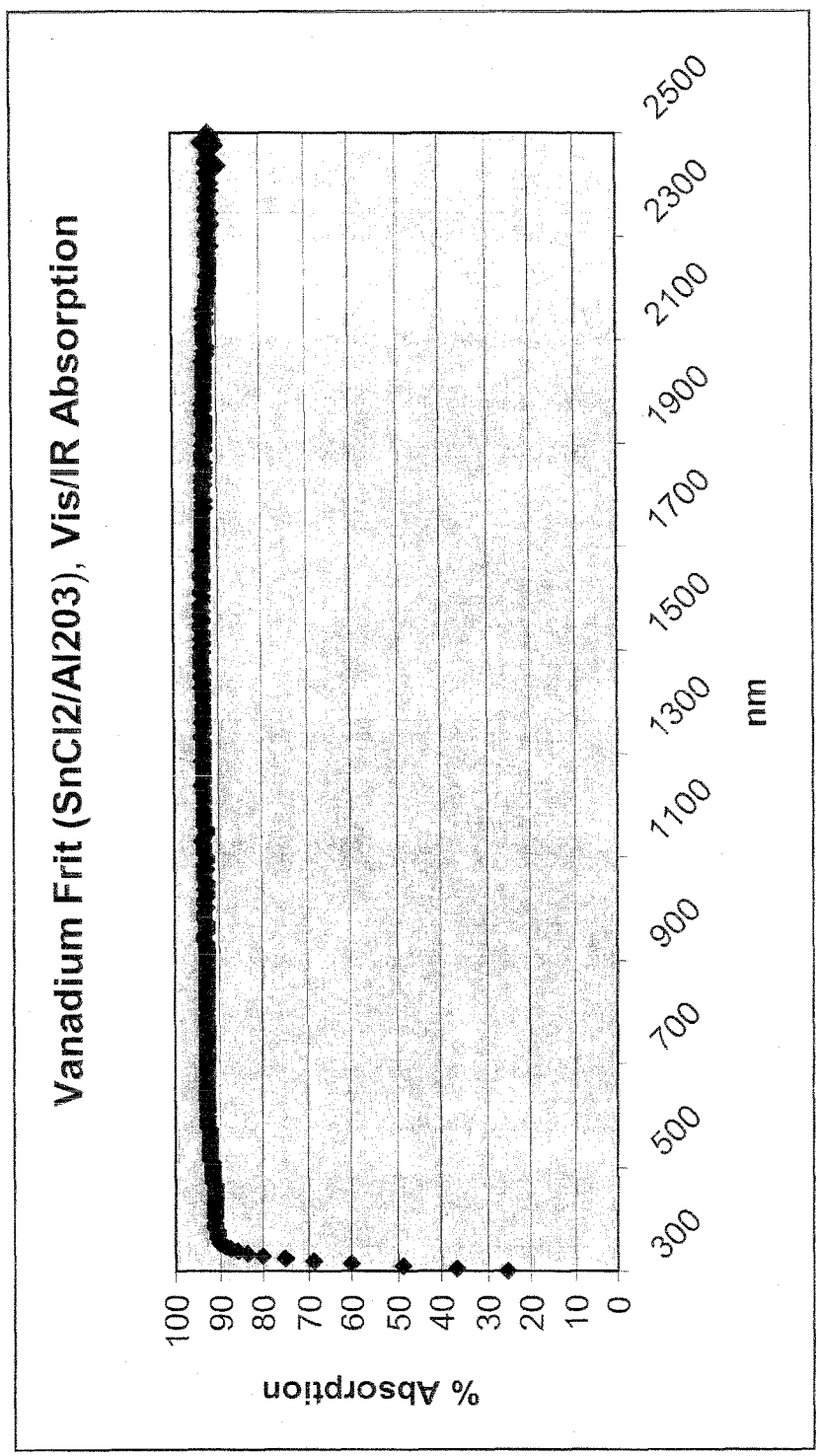
Figure 11C:
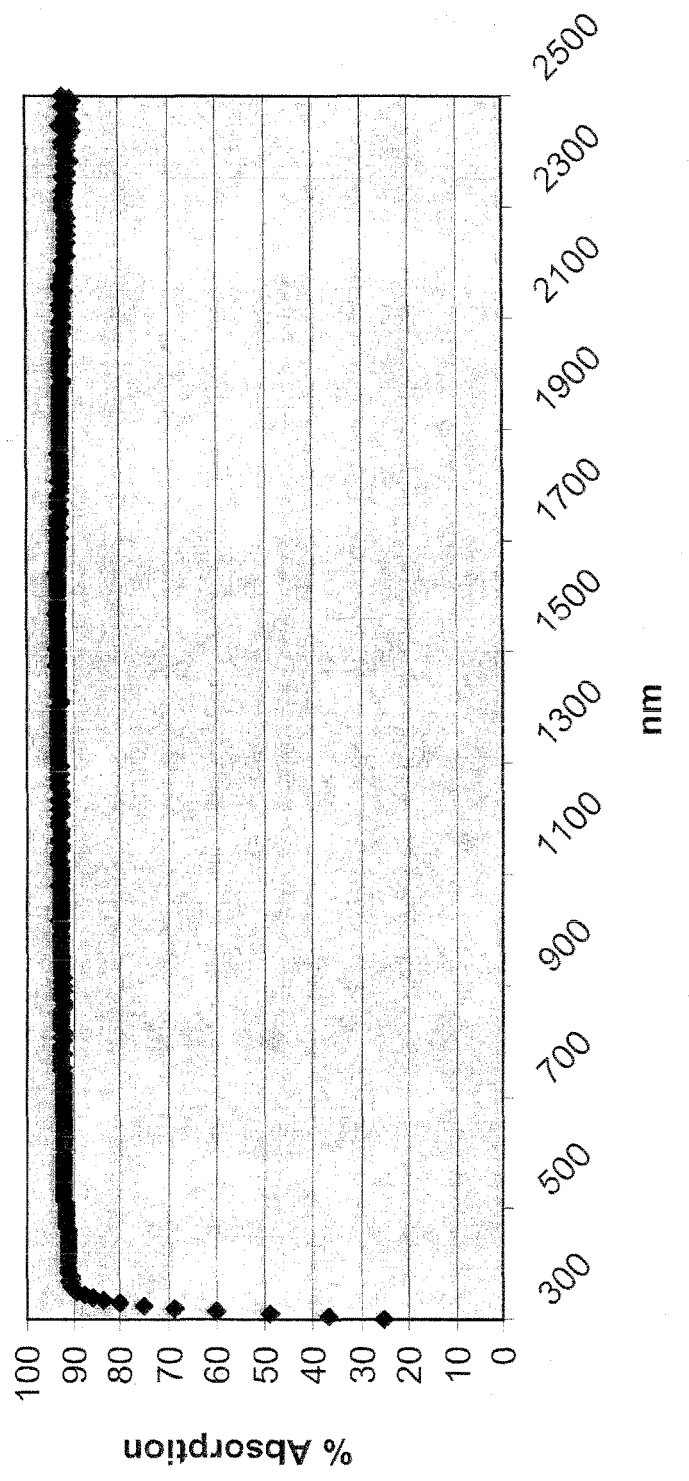

FIGS. 11A-11C show graphs illustrating absorption in the visible and infrared wavelengths for vanadium based frits according to certain example embodiments. As shown in the graphs, example vanadium based frits may have absorption of at least 90% across a substantial breath of the visible and IR spectrum. In certain example embodiments the absorption may be about 95%. As discussed in application Ser. No. 12/929,874 (now U.S. Pat. No. 8,733,128) entitled "IMPROVED FRIT MATERIALS AND/OR METHOD OF MAKING VACUUM INSULATING GLASS UNITS INCLUDING THE SAME", the entire contents of which are incorporated herein by reference, frit materials with high visible/IR absorption may be advantageous.

FIG. 11A shows the absorption properties of a vanadium based frit with $TeO_2$ and $Al_2O_3$ used as additives (e.g., Ex. 3 of Table 6). FIG. 11B shows the absorption properties of a vanadium based frit with $SnCl_2$ and $Al_2O_3$ used as additives (e.g., Ex. 16 of Table 6). FIG. 11C shows the absorption properties of a vanadium based frit with $SnCl_2$ and $SiO_2$ used as additives (e.g., Ex. 21 of Table 6).

In certain example embodiments, the application of IR energy to a frit material may be based on a heating profile where the IR energy applied to the frit varies over time. Exemplary heating profiles may be found in application Ser. No. 12/929,874 (now U.S. Pat. No. 8,733,128) the entire contents of which are incorporated herein by reference.

In certain example embodiments, a base composition may be augmented by 3 or 4 additives. For example, a batch for a base composition (in grams) may include $V_2O_5$ at 52.5, BaO at 22.5, ZnO at 10. Accordingly, three and/or more additives from among TeO2, SnCl2, Al2O3, and SiO2 may be selected to augment the base composition. The ranges (in grams) for the additives may vary between 0 to 7.5 grams per additive. Thus, on a normalized molar percentage the above additives may be included at between 0% and 6%. Thus, the normalized molar percentage of a base composition may be $V_2O_5$ at between about 43% and 50%, BaO between about 22% and 26%, ZnO between about 18% and 22%. In certain example embodiments, additives (on a normalized molar basis) of TeO2 at around 2%, SnCl2 around 2%, Al2O3 around 2%, and SiO2 around 4% may be added to the base composition.

The techniques, compositions, etc disclosed herein may be used other methods and/or systems for forming a VIG unit. For example, a vanadium based frit may be used to form an edge seal of a VIG unit. Systems, apparatuses, and/or methods used for creating a VIG unit may be described in co-pending application Ser. No. 12/929,876 entitled "LOCALIZED HEATING TECHNIQUES INCORPORATING TUNABLE INFRARED ELEMENT(S) FOR VACUUM INSULATING GLASS UNITS, AND/OR APPARATUSES FOR THE SAME", the entire contents of which are hereby incorporated by reference.

It will he appreciated by those skilled in the art that CTE adjustments may be carried out on the overall frit material (e.g., the compound) for the wetting and bonding properties of the frit to cooperate with an underlying substrate (e.g., a glass substrate).

It will be appreciated that one or more metal oxide, chloride, and/or fluoride additives may be used as additives in different embodiments of this invention. Furthermore, in certain example implementations, the metal oxide, chloride, and/or fluoride additives may be stoichiometric or sub-stoichiometric.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers there between.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a frit material, the method comprising:

providing a composition to a holder, the composition comprising:

| Ingredient | Wt. % |
| --- | --- |
| vanadium oxide | ~50-60%, |
| barium oxide | ~27-33%, |
| zinc oxide | ~9-12%; | and
at least one additive;
melting the composition;
cooling the melted composition and/or allowing the melted composition to cool so as to form an intermediate glass article;
grinding the intermediate glass article in making the frit material; and
wherein the at least one additive comprises $Nb_2O_5$ and constitutes between about 2-8 wt. %.

2. A method of making a frit material, the method comprising:

providing a composition to a holder, the composition comprising:

| Ingredient | Wt. % |
| --- | --- |
| vanadium oxide | ~50-60%, |
| barium oxide | ~27-33%, |
| zinc oxide | ~9-12%; | and
at least one additive;
melting the composition;
cooling the melted composition and/or allowing the melted composition to cool so as to form an intermediate glass article;
grinding the intermediate glass article in making the frit material; and
wherein the at least one additive comprises $Ta_2O_5$ and constitutes between about 4.5-10 wt. %.

3. A method of making a VIG window unit, comprising providing the frit of claim 1 between first and second glass substrates and melting the frit in forming an edge seal between first and second glass substrates of the VIG window unit.

4. A method of making a VIG window unit, comprising providing the frit of claim 2 between first and second glass substrates and melting the frit in forming an edge seal between first and second glass substrates of the VIG window unit.

5. A method of making a VIG window unit, the method comprising:

providing first and second spaced apart glass substrates, with a plurality of spacers between the glass substrates to space the glass substrates apart;

forming an edge seal for the VIG window unit between the glass substrates, the edge seal comprising a composition comprising:

| Ingredient | Wt. % |
| --- | --- |
| vanadium oxide | ~50-60%, |
| barium oxide | ~27-33%, |
| zinc oxide | ~9-12%; | and
at least one additive $Nb_2O_5$ constituting between about 2-8 wt. %.

* * * * *